United States Patent
Kang et al.

(10) Patent No.: US 12,386,215 B2
(45) Date of Patent: Aug. 12, 2025

(54) DISPLAY DEVICE WITH A MULTI-PART COVER

(71) Applicant: LG Display Co., Ltd., Seoul (KR)

(72) Inventors: ChounSung Kang, Gimpo-si (KR); Daeyun Kim, Seoul (KR); GeunChang Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/473,031

(22) Filed: Sep. 22, 2023

(65) Prior Publication Data

US 2024/0192535 A1    Jun. 13, 2024

(30) Foreign Application Priority Data

Dec. 9, 2022 (KR) .......................... 10-2022-0171716

(51) Int. Cl.
*G02F 1/1333* (2006.01)
*G06F 1/16* (2006.01)

(52) U.S. Cl.
CPC .. *G02F 1/133305* (2013.01); *G02F 1/133314* (2021.01); *G06F 1/1652* (2013.01)

(58) Field of Classification Search
CPC ......... G02F 1/133305; G02F 1/133308; G02F 1/133314; G06F 1/1652
See application file for complete search history.

(56) References Cited

U.S. PATENT DOCUMENTS

| | | | |
|---|---|---|---|
| 11,170,671 B1 | 11/2021 | Han et al. | |
| 2018/0130974 A1* | 5/2018 | Koo | G02F 1/133308 |
| 2020/0103741 A1 | 4/2020 | Song et al. | |
| 2020/0159288 A1* | 5/2020 | Song | G09F 9/301 |
| 2021/0068276 A1* | 3/2021 | Kim | H05K 5/0017 |
| 2021/0327311 A1* | 10/2021 | Han | G06F 1/1601 |

FOREIGN PATENT DOCUMENTS

| | | | |
|---|---|---|---|
| CN | 107342018 A | | 11/2017 |
| CN | 110580859 A | | 12/2019 |
| CN | 112967609 A | | 6/2021 |
| KR | 2021-0078242 | * | 6/2021 |
| KR | 20210078242 A | | 6/2021 |
| TW | 202110301 A | | 3/2021 |

* cited by examiner

*Primary Examiner* — Paisley L Wilson
(74) *Attorney, Agent, or Firm* — Seed IP Law Group LLP

(57) ABSTRACT

A display device includes a display panel, a cover configured to support a rear surface of the display panel, and a roller configured to wind or unwind the display panel and the cover. The cover includes an upper cover bonded to the display panel, and the upper cover includes a first upper cover and a second upper cover. The second upper cover includes a plurality of concave portions and a plurality of convex portions, and the first upper cover is disposed between the display panel and the second upper cover. The first upper cover is disposed to engage with the plurality of concave portions and the plurality of convex portions of the second upper cover.

19 Claims, 25 Drawing Sheets

DISPLAY DEVICE WITH A MULTI-PART COVER

CROSS-REFERENCE TO RELATED APPLICATIONS

This application claims the priority of Korean Patent Application No. 10-2022-0171716 filed on Dec. 9, 2022, in the Korean Intellectual Property Office, the entire contents of which are incorporated herein by reference.

BACKGROUND

Technical Field

The present disclosure relates to a display device, and more particularly, but not exclusively to a rollable display device capable of displaying images even in a case in which the display device is rolled up.

Description of the Related Art

As display devices used for a monitor of a computer, a TV set, a mobile phone, and the like, there are an organic light-emitting display (OLED) configured to autonomously emit, and a liquid crystal display (LCD) that requires a separate light source.

The range of application of the display devices is diversified from the monitor of the computer and the TV set to personal mobile devices, and studies are being conducted on the display devices having wide display areas and having reduced volumes and weights.

In addition, recently, a rollable display device, which is made by forming display elements, lines, and the like on a substrate made of a flexible plastic material having flexibility and thus may display images even in a case in which the rollable display device is rolled up, has attracted attention as a next-generation display device.

BRIEF SUMMARY

In an embodiment of the present disclosure, a display device is provided that is capable of improving the bending of the display panel.

In an embodiment of the present disclosure, a display device is provided that is capable of improving rigidity of the display panel while reducing a thickness of the display device.

In an embodiment of the present disclosure, a display device is provided that is capable of reducing a problem in which an opening portion of an upper cover is visually recognized.

In an embodiment of the present disclosure, a display device is provided that is capable of reducing the occurrence of flexure on a display part at the time of winding the display part.

According to one or more embodiments of the present disclosure, a display device includes: a display panel; a cover configured to support a rear surface of the display panel; and a roller configured to wind or unwind the display panel and the cover, in which the cover includes an upper cover bonded to the display panel, in which the upper cover includes a first upper cover, and a second upper cover including a plurality of concave portions and a plurality of convex portions, in which the first upper cover is disposed between the display panel and the second upper cover, and in which the first upper cover is disposed to engage with the plurality of concave portions and the plurality of convex portions of the second upper cover.

According to one or more embodiments of the present disclosure, a display device includes: a plate for a display device includes: a first plate including a plurality of first opening portions; and a second plate disposed on a rear surface of the first plate and including a plurality of protruding patterns, in which the plurality of protruding patterns of the second plate is inserted into the plurality of first opening portions of the first plate, and in which a spacing distance between each of the plurality of protruding patterns and a side surface of each of the plurality of first opening portions increases in a direction from a central portion to an edge of the plate.

According to the present disclosure, the plurality of back covers having different thicknesses are disposed to engage with one another, thereby maintaining rigidity of the display device and reducing a thickness of the display device.

According to the present disclosure, it is possible to suppress bending of the display device.

According to the present disclosure, it is possible to minimize a situation in which the opening portion is visually recognized from the front surface of the display device.

According to the present disclosure, it is possible to reduce the occurrence of flexure on the display part caused by a slip of the upper cover during a winding process.

Embodiments of the present disclosure are not limited to the above-mentioned embodiments, and other embodiments, which are not mentioned above, can be clearly understood by those skilled in the art from the following descriptions.

Other details of the embodiments are provided in the detailed description with reference to the accompanying drawings.

The benefits and advantages according to the present disclosure are not limited to the contents exemplified above, and more various benefits and advantages are included in the present specification.

BRIEF DESCRIPTION OF THE SEVERAL VIEWS OF THE DRAWINGS

The above and other aspects, features and advantages of the present disclosure will be more clearly understood from the following detailed description taken in conjunction with the accompanying drawings, in which.

DETAILED DESCRIPTION

Figure 1A:
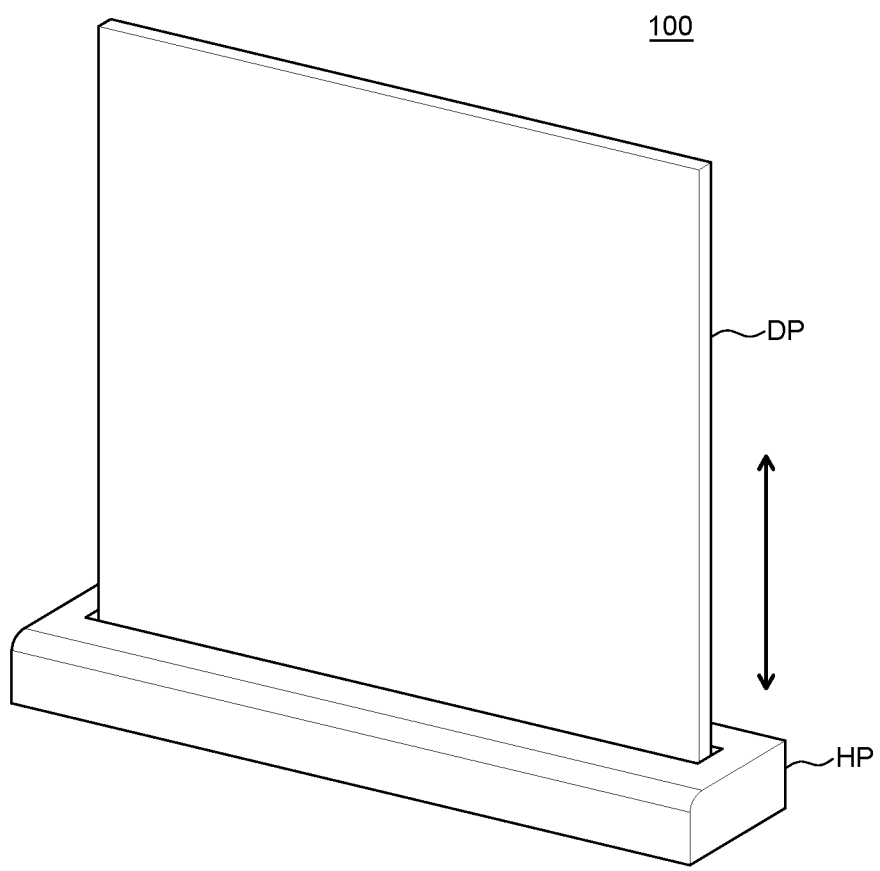
FIGS. 1A and 1B are front perspective views of a display device in an unrolled and a rolled configuration, respectively, according to an embodiment of the present disclosure.

Advantages and characteristics of the present disclosure and a method of achieving the advantages and characteristics will be clear by referring to the embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various embodiments of the present disclosure will be described in detail with reference to the accompanying drawings.

Display Device—Rollable Display Device

A rollable display device refers to a display device capable of displaying images even in a case in which the rollable display device is rolled up. The rollable display device may have higher flexibility than a general display device in the related art. A shape of the rollable display device may be freely changed depending on whether the rollable display device is used. Specifically, when the rollable display device is not in use, the rollable display device may be rolled up and stored with a reduced volume. On the contrary, when the rollable display device is in use, the rolled-up rollable display device may be unrolled again and used.

Figure 1B:
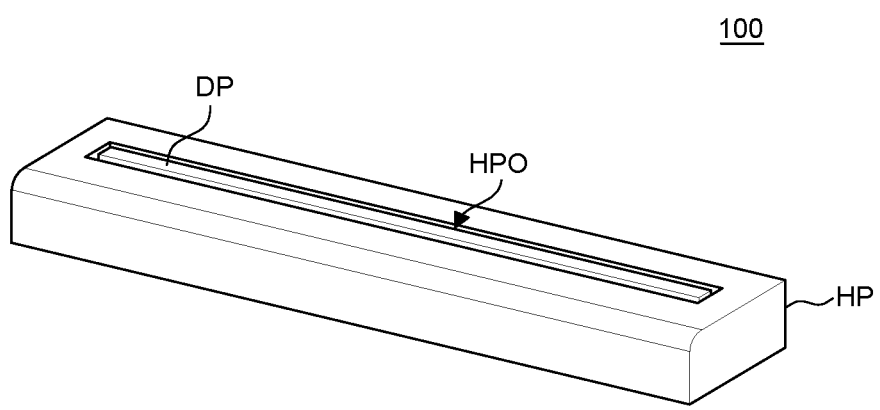

FIGS. 1A and 1B are perspective views of a display device 100 according to an embodiment of the present disclosure. With reference to FIGS. 1A and 1B, a display device according to an embodiment of the present disclosure includes a display part DP (which may also be referred to herein as a display assembly DP) and a housing part HP (which may also be referred to herein as a housing HP).

The display part DP is configured to display images to a user. For example, display elements and circuits, lines, and components for operating the display elements may be disposed on the display part DP. In this case, because the display device 100 according to the embodiment of the present disclosure is a rollable display device, the display part DP may be configured to be wound or unwound. For example, the display part DP may include a display panel 120 (see FIG. 4B) and an upper cover 110a (see FIG. 4A) that have flexibility so as to be wound or unwound. The display part DP, including the display panel 120 and upper cover 110a, will be described below in more detail with reference to FIGS. 4A to 5.

The housing part HP is a casing capable of accommodating the display part DP.

The housing part HP may have an opening portion HPO (which may also be referred to herein as an opening HPO) through which the display part DP may move to the outside or the inside of the housing part HP.

Meanwhile, the display part DP of the display device 100 may switch from a fully unwound state illustrated in FIG. 1A with the display part DP extending from the housing part HP through the opening portion HPO to a fully wound state illustrated in FIG. 1B in which the display part DP is received completely internal to the housing part HP through the opening portion HPO, or may switch from the fully wound state to the fully unwound state at the selection of a user.

A drive part MP (which may also be referred to herein as a drive assembly MP) is disposed in the housing part HP to wind or unwind the display part DP to switch the display part DP to the fully unwound state or the fully wound state, as described further below.

Drive Part

Figure 2:
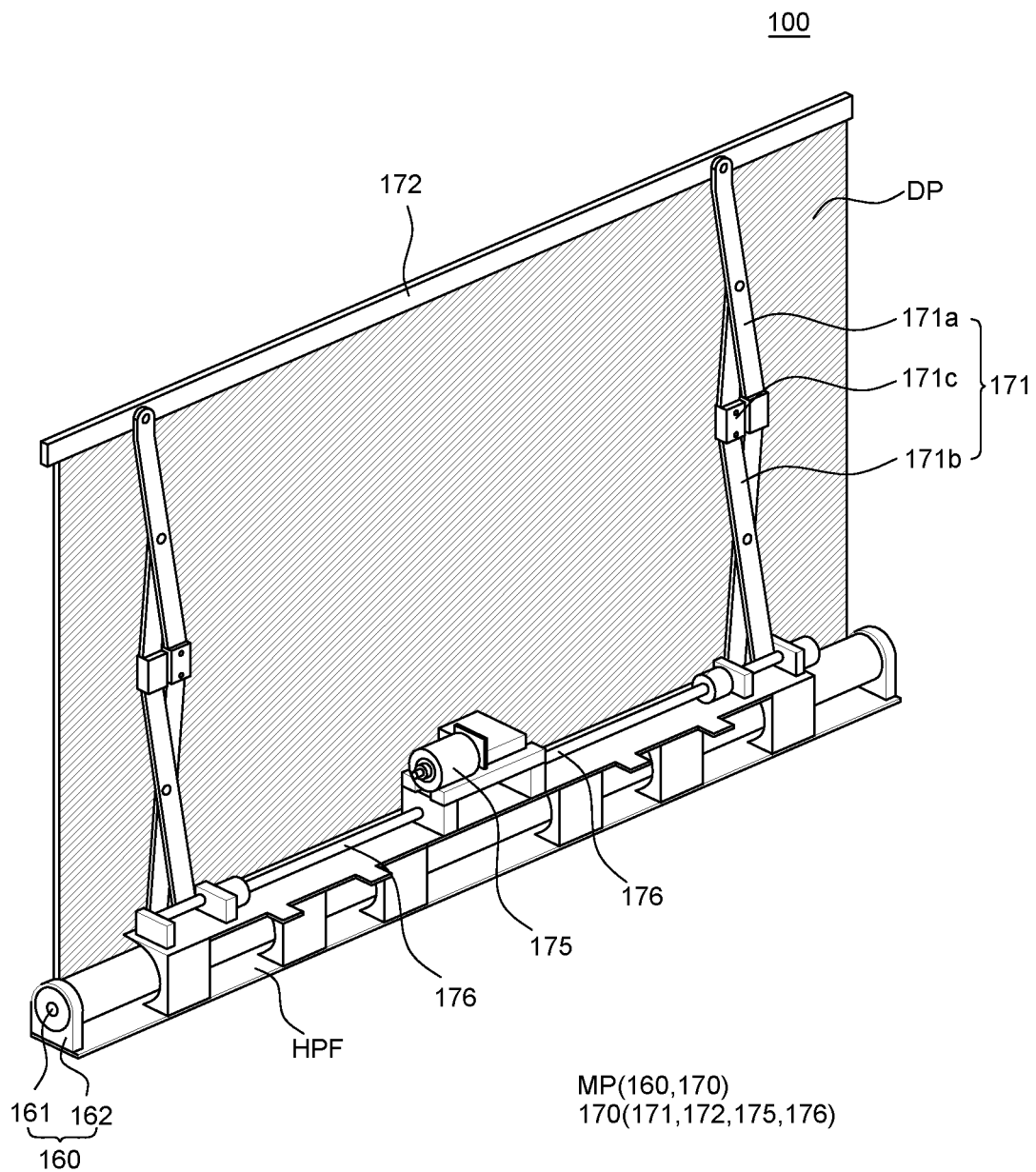
FIG. 2 is a rear perspective view of the display device of FIG. 1A.
Figure 3:
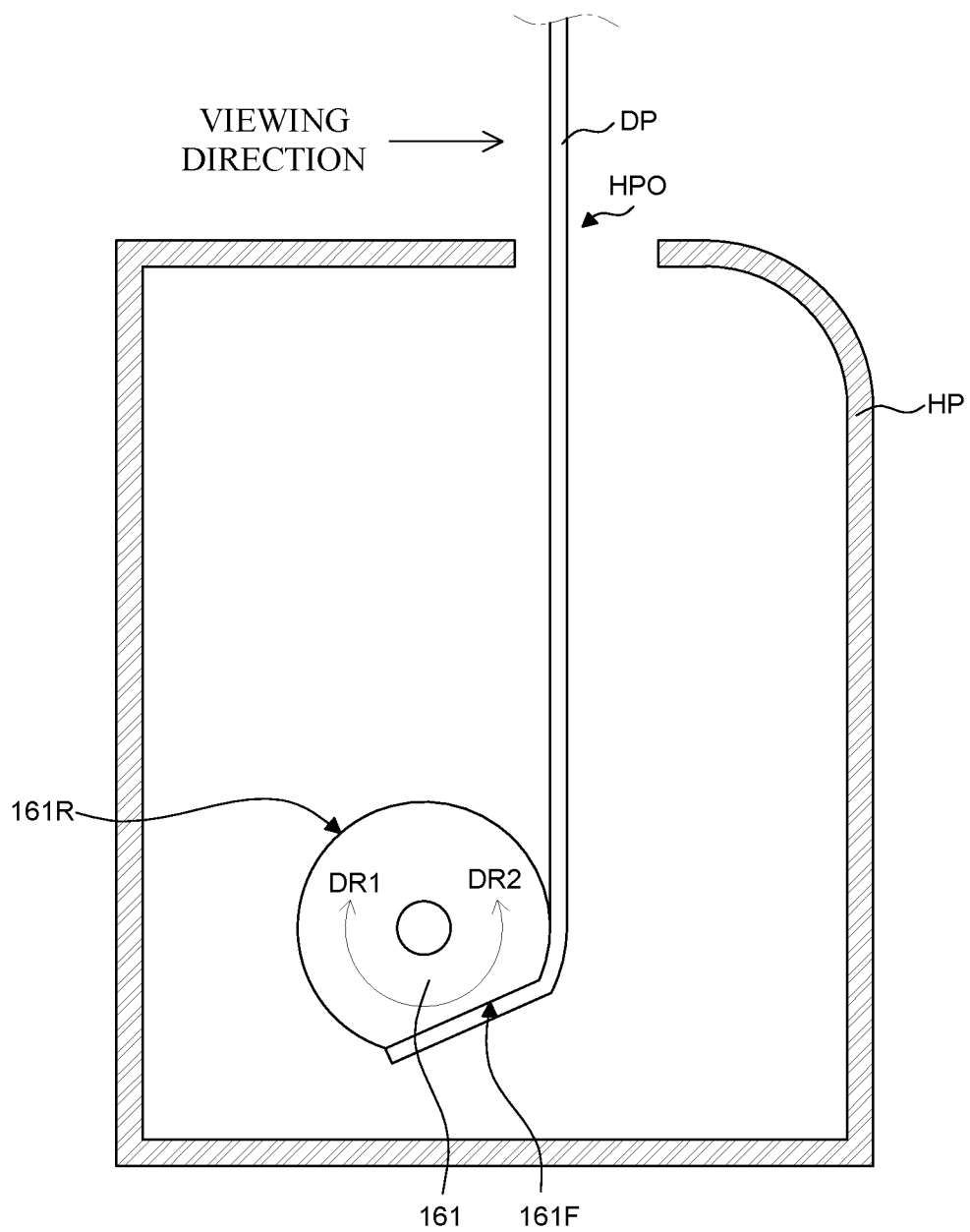
FIG. 3 is a schematic cross-sectional view of the display device FIG. 1A.

FIG. 2 is a perspective view of the display device 100. FIG. 3 is a schematic cross-sectional view of the display device 100. FIG. 3 illustrates a roller 161 and the display part DP of the display device 100 according to one or more embodiments of the present disclosure in more detail. For the convenience of description, FIG. 3 illustrates only the housing part HP, the roller 161, and the display part DP.

First, with reference to FIG. 2, the drive part MP includes a roller part 160 and a lifting part 170.

The roller part 160 winds or unwinds the display part DP fixed to the roller part 160 while rotating clockwise or counterclockwise. The roller part 160 includes the roller 161 and roller support parts 162 (which may also be referred to herein as roller supports 162).

The roller 161 refers to a member around which the display part DP is wound. For example, the roller 161 may have a cylindrical shape. A lower edge of the display part DP may be fixed to the roller 161. When the roller 161 rotates, the display part DP having the lower edge fixed to the roller 161 may be wound around the roller 161. In contrast, when the roller 161 rotates in the reverse direction, the display part DP wound around the roller 161 may be unwound from the roller 161.

With reference to FIG. 3, the roller 161 may have a cylindrical shape in which at least a portion of an outer peripheral surface of the roller 161 has a flat surface, and the remaining portion of the outer peripheral surface has a curved surface. The roller 161 may have a cylindrical shape as a whole, but a part of the roller 161 may have a flat surface. That is, a portion of the outer peripheral surface of the roller 161 is flat, and the remaining portion of the outer peripheral surface is curved. For example, the roller 161 may include a curved surface portion 161R and a flat surface portion 161F. The flat surface portion 161F of the roller 161 may be a portion on which a plurality of flexible films and a printed circuit board of the display part DP are seated or disposed. However, the roller 161 may have a complete cylindrical shape or any shape around which the display part DP may be wound. Thus, the present disclosure is not limited to the particular shape or shapes shown and described herein.

With reference back to FIG. 2, the roller support parts 162 support the roller 161 at two opposite sides of the roller 161. Specifically, the roller support part 162 is disposed on a bottom surface HPF of the housing part HP. Further, side surfaces of upper ends of the roller support parts 162 are coupled to two opposite ends of the roller 161. Therefore, the roller support parts 162 may support the roller 161 so that the roller 161 is spaced apart from the bottom surface HPF of the housing part HP. In an embodiment, the roller 161 may be rotatably coupled to the roller support parts 162.

The lifting part 170 moves the display part DP in an upward or downward direction in conjunction with an operation of the roller part 160. The lifting part 170 includes link parts 171 (which may also be referred to herein as links 171), a head bar 172, a motor 175, and rotary parts 176 (which may also be referred to herein as an axle 176).

The link part 171 of the lifting part 170 includes a plurality of links 171a and 171b, and a hinge 171c configured to connect the plurality of links 171a and 171b. Specifically, the plurality of links 171a and 171b include a first link 171a and a second link 171b. The first link 171a and the second link 171b are rotatably fastened by means of the hinge 171c while intersecting each other in a scissors shape. Therefore, when the link part 171 moves in the upward or downward direction, the plurality of links 171a and 171b may rotate in a direction toward or away from one another. The link part 171 may include the plurality of links 171a and 171b that intersect each other. However, the present disclosure is not limited thereto. The link part 161 may include a single link that does not intersect.

The head bar 172 of the lifting part 170 is fixed to an uppermost end of the display part DP. The head bar 172 may be connected to the link parts 171 and move the display part DP in the upward or downward direction via rotation or movement of the plurality of links 171a and 171b of the link parts 171. That is, the display part DP may be moved in the upward or downward direction by the head bar 172 and the link part 171.

The head bar 172 covers only a part of the display part DP adjacent to the edge of the uppermost end of the display part DP so as not to cover an image displayed on a front or viewing surface of the display part DP. The display part DP and the head bar 172 may be fixed by a screw. However, the present disclosure is not limited thereto.

The motor 175 may be connected to a power generator, such as a separate external power source or an embedded battery, and supplied with power from the power generator. The motor 175 generates a rotational force and provides driving power to the rotary parts 176.

The rotary part 176 is connected to the motor 175 and configured to convert a rotational motion provided from the motor 175 into a rectilinear reciprocating motion. That is, the rotational motion of the motor 175 may be converted into the rectilinear reciprocating motion of a structure fixed to the rotary part 176. For example, the rotary part 176 may be implemented as a ball-screw mechanism including a shaft and a nut fastened to the shaft. The motor 175 may be operable to rotate a drive shaft in communication with the shaft of the rotary part 176. The rotation of the rotary part 176 moves the nut in a linear direction along the shaft of the rotary part 176. Because the link parts 171 are mechanically connected to the nut of the rotary part 176, the movement of the nut results in movement or rotation of the link parts 171. However, the present disclosure is not limited thereto.

The motor 175 and the rotary part 176 may operate in conjunction with the link part 171, thereby moving the display part DP upward or downward. The link parts 171 may each have a link structure and be repeatedly folded or unfolded by receiving the driving power from the motor 175 and the rotary parts 176.

Specifically, to wind the display part DP, the motor 175 may operate, and the structure of the rotary part 176 may rectilinearly move. That is, a part of the rotary part 176 to which one end of the second link 171b is connected may rectilinearly move. Therefore, one end of the second link 171b may move toward the motor 175, and the plurality of links 171a and 171b are folded, such that a height of the link part 171 may decrease. In addition, during the process of folding the plurality of links 171a and 171b, the head bar 172 connected to the first link 171a also moves downward, and one end of the display part DP connected to the head bar 172 also moves downward.

To unwind the display part DP, the motor 175 may operate, and the structure of the rotary part 176 may rectilinearly move. That is, a part of the rotary part 176 to which one end of the second link 171b is connected may rectilinearly move. Therefore, one end of the second link 171b may move away from the motor 175, and the plurality of links 171a and 171b may be unfolded, such that the height of the link part 171 may increase. In addition, during the process of unfolding the plurality of links 171a and 171b, the head bar 172 connected to the first link 171a also moves upward, and the display part DP connected to the head bar 172 also moves upward.

Therefore, when the display part DP is fully wound around the roller 161, the link part 171 of the lifting part 170 is kept folded. That is, when the display part DP is fully wound around the roller 161, the lifting part 170 may have the lowest height. In contrast, when the display part DP is fully unwound, the link part 171 of the lifting part 170 is kept unfolded. That is, when the display part DP is fully unwound, the lifting part 170 may have the highest height.

Meanwhile, to wind the display part DP, the roller 161 may rotate, and the display part DP may be wound around the roller 161. With reference to FIG. 3, for example, a lower edge of the display part DP is connected to the roller 161. Further, when the roller 161 rotates in a first direction DR1, i.e., clockwise, the display part DP may be wound so that a rear surface of the display part DP is in close contact with the surface of the roller 161.

To unwind the display part DP, the roller 161 may rotate, and the display part DP may be unwound from the roller 161. Referring to FIG. 3, for example, when the roller 161 rotates in a second direction DR2, i.e., counterclockwise, the display part DP wound around the roller 161 may be unwound from the roller 161 and disposed outside the housing part HP.

In some embodiments, the drive part MP having other structures other than the above-mentioned drive part MP may be applied to the display device 100. That is, the components of the roller part 160 and the lifting part 170 may be changed, some of the components may be eliminated, or other components may be added as long as the components may wind and unwind the display part DP.

Display Part

Figure 4A:
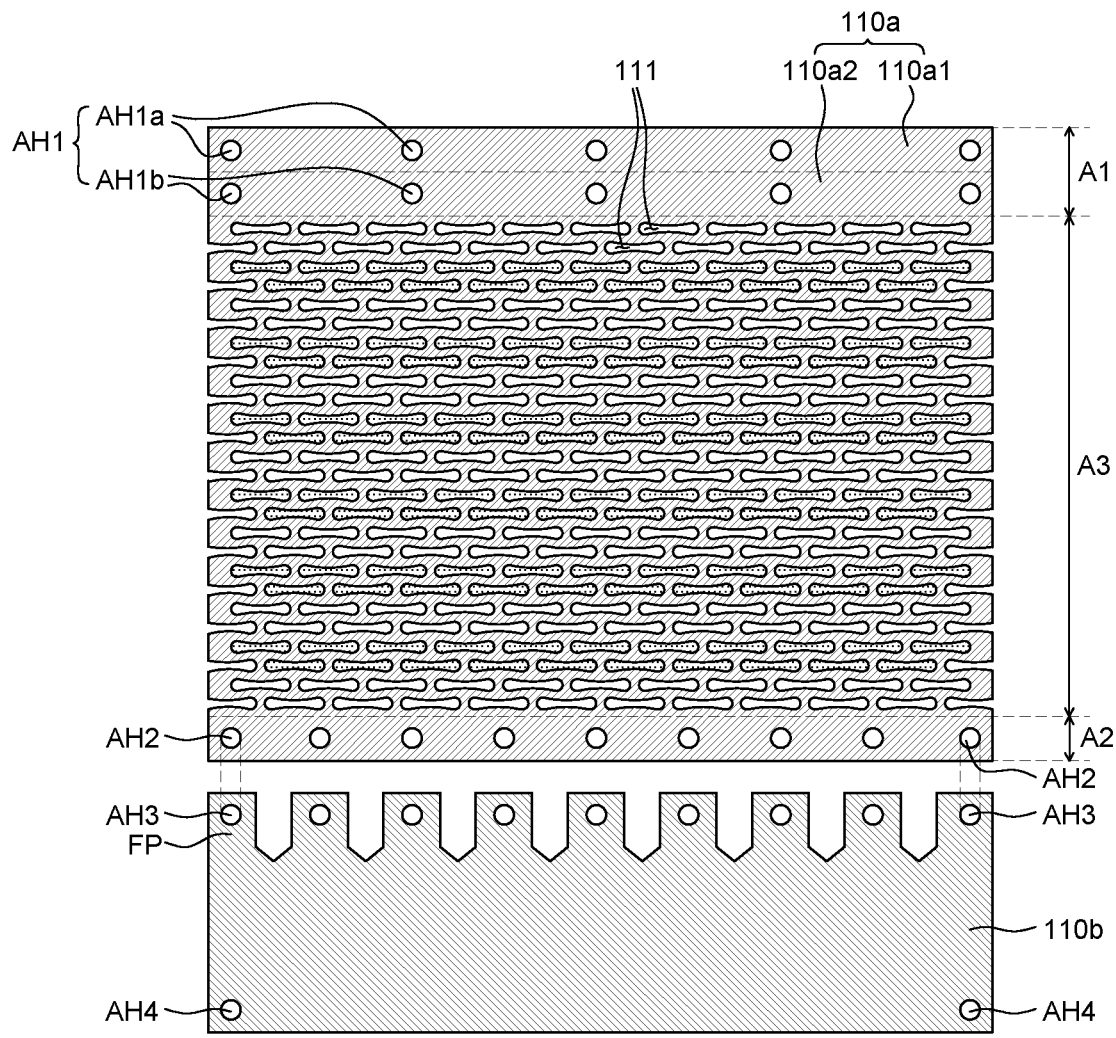
FIG. 4A is an exploded elevational view of an upper cover and a lower cover of the display device of FIG. 1A.
Figure 4B:
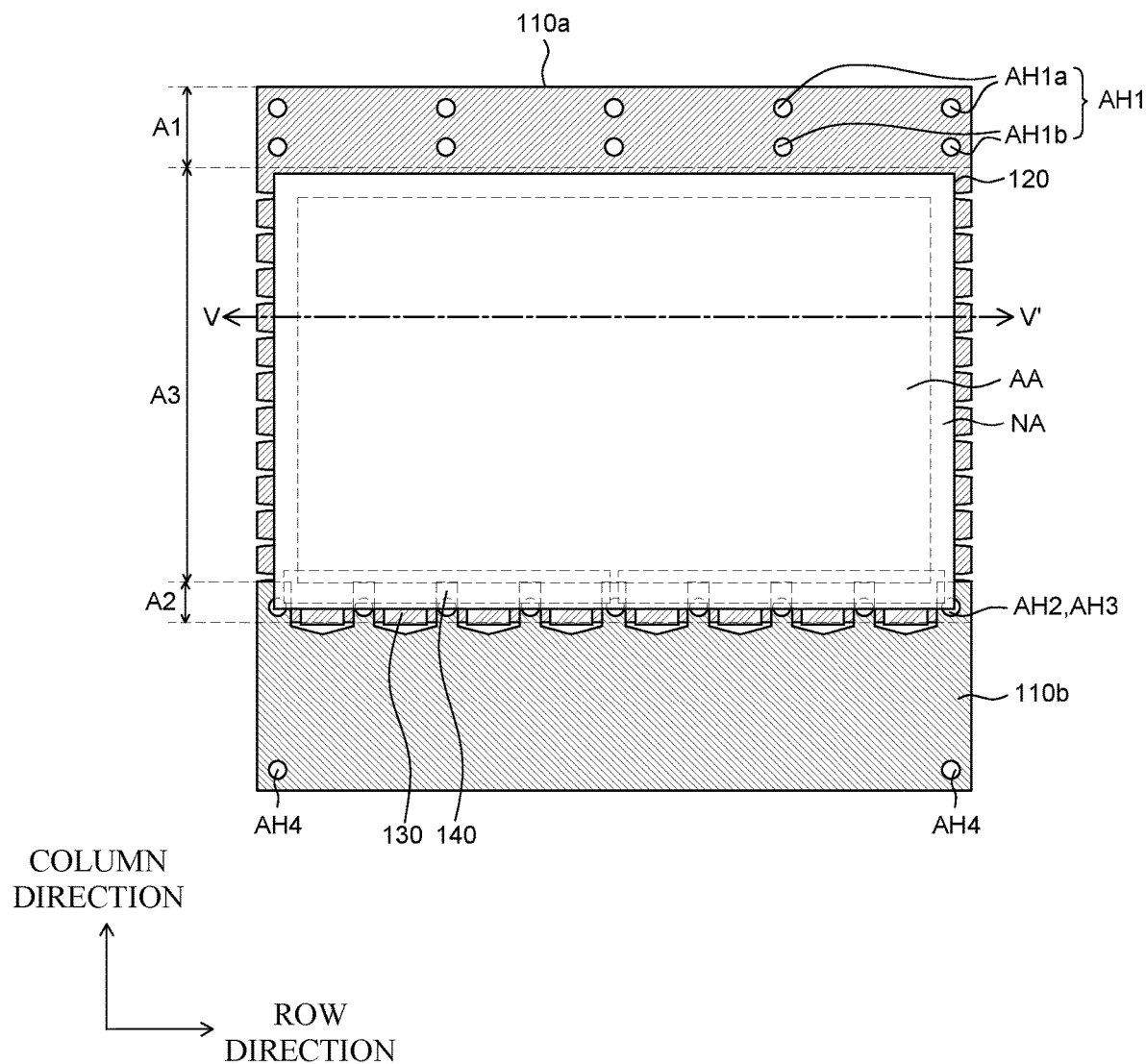
FIG. 4B is an elevational view of a display of the display device of FIG. 1A.
Figure 5:
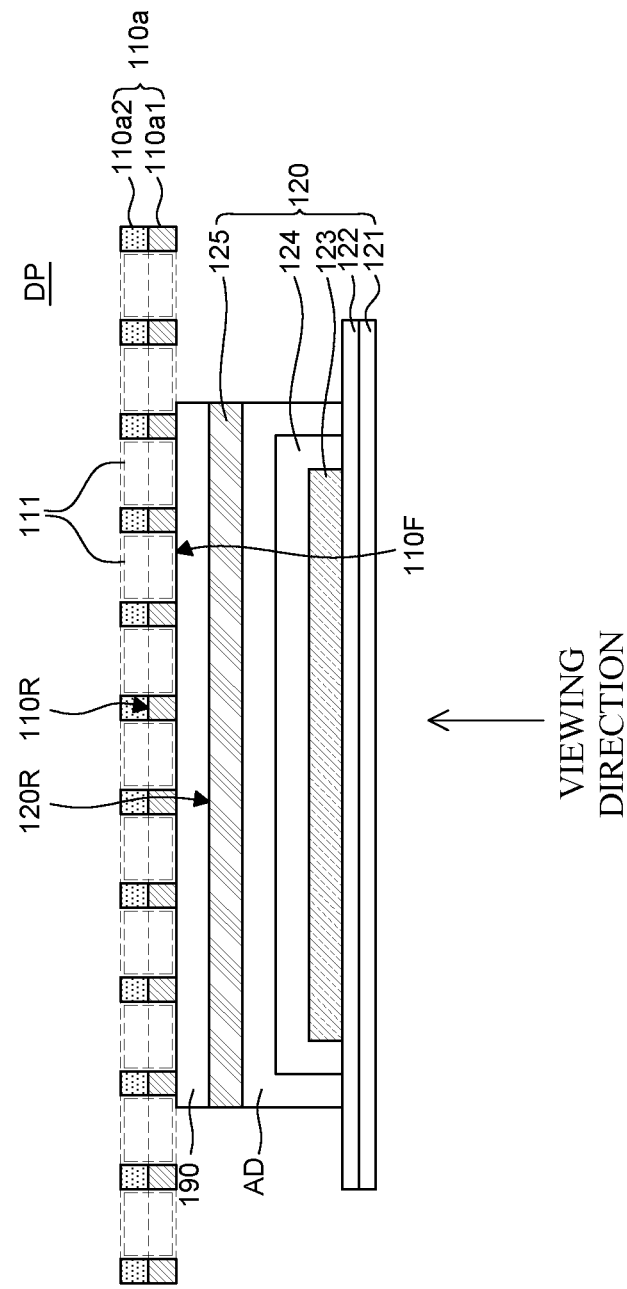
FIG. 5 is a cross-sectional view taken along line V-V' in FIG. 4B.

FIG. 4A is an exploded elevational view of an upper cover 110a and a lower cover 110b of the display device 100 according to one or more embodiments of the present disclosure. FIG. 4B is an elevational view of the display part DP of the display device 100 according to one or more embodiments of the present disclosure. FIG. 5 is a cross-sectional view taken along line V-V' in FIG. 4B.

With reference to FIGS. 4A and 4B, the display part DP includes the upper cover 110a, the display panel 120, a plurality of flexible films 130, a printed circuit board 140, and the lower cover 110b. However, the present disclosure is not limited thereto. The display part DP may include only the display panel 120, the plurality of flexible films 130, and the printed circuit board 140, among other possible configurations.

With reference to FIGS. 4A and 4B, the upper cover 110a is disposed on a rear surface 120R (see FIG. 5) of the display panel 120 and supports the display panel 120. Because the upper cover 110a is disposed on the rear surface 120R of the display panel 120, the upper cover 110a may also be called a back cover. A size of the upper cover 110a may be larger than a size of the display panel 120. The upper cover 110a may protect the display part DP from the outside.

The upper cover 110a may be fastened to the head bar 172 and the lower cover 110b, such as with fasteners of the type described herein, or others.

The upper cover 110a includes a first area A1, a second area A2, and a third area A3. The first area A1 and the second area A2 are areas in which a plurality of opening portions 111 is not disposed. The third area A3 is an area in which the plurality of opening portions 111 is disposed. Specifically, the upper cover 110a includes the first area A1, the second area A2, and the third area A3. The first area A1, the third area A3, and the second area A2 are sequentially disposed from the uppermost end of the upper cover 110a, i.e., from top to bottom. In an embodiment, because the upper cover 110a is wound or unwound in the column direction, the first area A1, the second area A2, and the third area A3 may be disposed in the column direction.

The first area A1 of the upper cover 110a is an uppermost end area of the upper cover 110a, i.e., an area fastened to the head bar 172. A plurality of first fastening holes AH1 may be formed in the first area A1 to enable the first area A1 to be fastened to the head bar 172. For example, fastening members may be disposed to penetrate the head bar 172 and the plurality of first fastening holes AH1, such that the head bar 172 and the first area A1 may be fastened to each other. Further, because the first area A1 is fastened to the head bar 172, the upper cover 110a may also move upward or downward when the link part 171 fastened to the head bar 172 moves upward or downward. Further, the display panel 120 attached to the upper cover 110a may also move upward or downward.

The plurality of first fastening holes AH1 may be disposed in a plurality of row directions. For example, the plurality of first fastening holes AH1 may include a plurality of first upper fastening holes AH1a disposed in the row direction, and a plurality of first lower fastening holes AH1b provided below the plurality of first fastening holes AH1a and disposed in the row direction. In other words, the first upper fastening holes AH1a and the first lower fastening holes AH1b may be provided in two parallel, spaced apart rows in the row direction with the first upper fastening holes AH1a and first lower fastening holes AH1b aligned with each other in the column direction in an embodiment.

FIGS. 4A and 4B illustrate ten first fastening holes AH1. However, the number of first fastening holes AH1 is not limited thereto and the number of first fastening holes AH1 may be selected according to design factors.

The second area A2 of the upper cover 110a is a lowermost area of the upper cover 110a, i.e., an area extending from the third area A3. One end, such as a bottom end, of the display panel 120 is disposed in the second area A2. For example, a pad area, which is a non-display area disposed at one end or a bottom end of the display panel 120, may be disposed in the second area A2. In an embodiment, the second area A2 of the upper cover 110a is coupled to the flat portion 161F of the roller 161, as best shown in FIG. 3.

The third area A3 of the upper cover 110a is an area disposed between the first area A1 and the second area A2. The third area A3 is an area in which the plurality of opening portions 111 is disposed and to which the display panel 120 is attached. Specifically, the third area A3 is an area wound around or unwound from the roller 161 together with the display panel 120. The third area A3 may at least overlap the display panel 120 among the other components of the display part DP. In an embodiment, the third area A3 is a majority of an area of the upper cover 110a that generally corresponds to the display panel 120. Because the first area A1 is coupled to the head bar 172 and the second area A2 is coupled to the roller 161, the third area A3 may be the primary area of the upper cover 110a that is wound or unwound about the roller 161 in some embodiments.

With reference to FIG. 4A, second fastening holes AH2 are disposed in the second area A2. The second fastening holes AH2 may be holes for fixing the lower cover 110b and the upper cover 110a. FIG. 4A illustrates nine second fastening holes AH2. However, the number of second fastening holes AH2 is a non-limiting example, and the present disclosure is not limited thereto. The number of second fastening holes AH2 can generally be selected according to design factors.

Meanwhile, the plurality of opening portions 111, which is formed in the third area A3, is not formed in the first area A1 and the second area A2. Specifically, the first fastening holes AH1 are formed in the first area A1, and the second fastening holes AH2 are formed in the second area A2. However, the plurality of opening portions 111 formed in the third area A3 are not formed in the first area A1 and the second area A2. In addition, the first and second fastening holes AH1 and AH2 are different in shape and function from the plurality of opening portions 111.

The first area A1 is an area fixed to the head bar 172. The second area A2 is an area that supports one end of the display panel 120, such as a bottom end of the display panel 120, the plurality of flexible films 130, and the printed circuit board 140. The first and second areas may have higher rigidity than the third area A3. Further, because the first and second areas A1 and A2 have comparatively higher rigidity, the first and second areas A1 and A2 may be securely fixed to the head bar 172 and the lower cover 110b and also provide support to the display panel 120. The second area A2 may maintain the printed circuit board 140 and the pad area of one end, such as a bottom end, of the display panel 120 in a flat shape, thereby protecting the printed circuit board 140 and the pad area of the display panel 120. The display part DP may be fixed to the head bar 172 of the drive part MP and moved to the inside or outside of the housing part HP by the operation of the drive part MP. The second area may protect the printed circuit board 140 and the pad area of one end or the bottom end of the display panel 120.

Meanwhile, FIG. 4A illustrates that the first area A1, the third area A3, and the second area A2 of the upper cover 110a are sequentially disposed in the column direction. However, in case that the upper cover 110a is wound in the row direction, the first area A1, the third area A3, and the second area A2 may be disposed in sequential order in the row direction.

The plurality of opening portions 111 disposed in the third area A3 of the upper cover 110a may be deformed by stress applied to the display part DP while the display part DP is wound or unwound. Specifically, the third area A3 of the upper cover 110a may be deformed as the plurality of opening portions 111 contract or expand while the display part DP is wound or unwound. Further, because the plurality of opening portions 111 contract or expand, a slip of the display panel 120 disposed on the third area A3 of the upper cover 110a is minimized, such that stress to be applied to the display panel 120 may be minimized.

Meanwhile, with reference to FIGS. 4A and 5, the upper cover 110a includes a first upper cover 110a1, and a second upper cover 110a2 disposed on a rear surface 110R of the first upper cover 110a1. The first upper cover 110a1 may be attached to the display panel 120. The second upper cover 110a2 may be disposed to engage with the first upper cover 110a1. In an embodiment, the upper cover 110a may instead be a plate 110a with the first upper cover 110a1 being a first plate 110a1 or a first upper plate 110a1 and the second upper cover 110a2 being a second plate 110a2 or a second upper plate 110a2, as described further with reference to FIGS. 13-14C.

The upper cover 110a will be described in detail with reference to FIGS. 6A to 6C.

The lower cover 110b may be fastened to the upper cover 110a and the roller 161 and connect the upper cover 110a and the roller 161. As described above, the lower cover 110b may connect the upper cover 110a and the roller 161, and connect the roller 161 and the display panel 120 disposed on the upper cover 110a. The shape of the lower cover 110b or the connection method may be variously changed in accordance with design as long as the lower cover 110b may be connected to the upper cover 110a and the roller 161. Thus, the present disclosure is not limited thereto.

One end of the lower cover 110b is an uppermost end area of the lower cover 110b and may overlap one end, such as a bottom end, of the upper cover 110a. For example, one end of the lower cover 110b may overlap the second area A2 of the upper cover 110a. One end of the lower cover 110b may be connected to and overlap a part of the upper cover 110a or connected to a part of the upper cover 110a by using a connection member, fastener, or the like. However, the present disclosure is not limited thereto.

The lower cover 110b may include a plurality of fastening parts FP that overlap the upper cover 110a. The plurality of fastening parts FP is disposed at one end, such as an upper end, of the lower cover 110b. In addition, a plurality of third fastening holes AH3 may be respectively disposed in the plurality of fastening parts FP so as to be fastened to the upper cover 110a. The plurality of fastening parts FP having the plurality of third fastening holes AH3 is spaced apart from one another, such that a space in which the plurality of flexible films 130 may be bent may be provided between the plurality of fastening parts FP. FIG. 4A illustrates nine third fastening holes AH3. However, the number of third fastening holes AH3 is a non-limiting example, and the present disclosure is not limited thereto. The number of third fastening holes AH3 may generally be selected based on design factors.

FIG. 4A illustrates that the second fastening holes AH2 of the upper cover 110a and the third fastening holes AH3 of the lower cover 110b for fastening the upper cover 110a and the lower cover 110b to each other are respectively disposed in the second area A2 of the upper cover 110a and at one end, such as an upper end, of the lower cover 110b. However, the upper cover 110a and the lower cover 110b may be fixed to each other without a separate fastening hole.

An area from one end to the other end of the lower cover 110b, i.e., a height across an entirety of the lower cover 110b in the column direction, is an area extending so that a display area AA (see FIG. 4B) of the display panel 120 may be disposed outside the housing part HP. For example, when the upper cover 110a and the display panel 120 are in the fully unwound state, the area from the other end, or bottom end, of the lower cover 110b fixed to the roller 161 to one end, or top end, of the lower cover 110b at which the plurality of flexible films 130 and the printed circuit board 140 are disposed may be disposed inside the housing part HP. The third area A3 of the upper cover 110a in which the display area AA of the display panel 120 is disposed and the first area A1 of the upper cover 110a may be disposed outside the housing part HP. That is, the area from the other end, or bottom end, of the lower cover 110b fixed to the roller 161 to the second area A2 and at least a part of one end, or top end, of the lower cover 110b may be disposed inside the housing part HP. In an embodiment where the display device 100 is wound or unwound in the row direction, i.e., horizontally, the top and bottom ends of the covers 110a, 110b may instead be left or right ends, respectively.

The other end, or bottom end, of the lower cover 110b is a lowermost end area of the lower cover 110b that is fastened to the roller 161. Fourth fastening holes AH4 may be formed at the other end, or bottom end, of the lower cover 110b so that the lower cover 110b can be fastened to the roller 161. For example, fastening members are disposed to penetrate the roller 161 and the fourth fastening holes AH4, such that the roller 161 may be fastened to the other end of the lower cover 110b. Further, as the other end of the lower cover 110b is fastened to the roller 161, the display panel 120, the upper cover 110a, and the lower cover 110b may be wound around or unwound from the roller 161. FIG. 4A illustrates two fourth fastening holes AH4. However, the number of fourth fastening holes AH4 is not limited thereto and may generally be selected based on design factors.

Meanwhile, the plurality of opening portions 111, which is formed in the third area A3 of the upper cover 110a, is not formed in the lower cover 110b in an embodiment. Specifically, the third fastening holes AH3 and the fourth fastening holes AH4 are formed at one end, such as a top end, and the other end, such as a bottom end, of the lower cover 110b. However, the plurality of opening portions 111, which is formed in the third area A3 of the upper cover 110a, is not formed in the lower cover 110b. In addition, the third fastening hole AH3 and the fourth fastening hole AH4 are different in shape from the plurality of opening portions 111.

The lower cover 110b may be made of a material having flexibility so that the lower cover 110b may be wound around or unwound from the roller 161. For example, the lower cover 110b may be made of a plastic material such as polyethylene terephthalate (PET). However, the material of the lower cover 110b may be variously changed in accordance with design as long as the material of the lower cover 110b satisfies physical property conditions such as a thermal deformation amount, a radius of curvature, rigidity, and the like. Thus, the present disclosure is not limited thereto.

In the present specification, the configuration has been described in which the upper cover 110a and the lower cover 110b are separately formed. However, the present disclosure is not limited thereto. The upper cover 110a and the lower cover 110b may be integrated as a single, unitary, integral structure.

With reference to FIGS. 4B and 5, the display panel 120 is disposed on one surface of the upper cover 110a, such as a front surface 110F of the upper cover 110a. The display panel 120 is provided on one surface, or front surface 110F, of the upper cover 110a and disposed in the third area A3. The display panel 120 is a panel configured to display images to a user. The display panel 120 may include a display element configured to display images, a driving element configured to operate the display element, and lines configured to transmit various types of signals to the display element and the driving element.

The display elements may have different configurations depending on the type of display panel 120. For example, in a case in which the display panel 120 is an organic light-emitting display panel 120, the display element may be an organic light-emitting element including an anode, an organic light-emitting layer, and a cathode. For example, in a case in which the display panel 120 is a liquid crystal display panel, the display element may be a liquid crystal display element. Hereinafter, the assumption is made that the display panel 120 is the organic light-emitting display panel.

However, the display panel 120 is not limited to the organic light-emitting display panel. In addition, because the display device 100 according to one or more embodiments of the present disclosure is a rollable display device 100, the display panel 120 may be implemented as a flexible display panel 120 so as to be wound around or unwound from the roller 161.

The display panel 120 includes the display area AA and a non-display area NA.

The display area AA is an area of the display panel 120 in which images are displayed. The display area AA may include a plurality of subpixels constituting the plurality of pixels, and a drive circuit configured to operate the plurality of subpixels. The plurality of subpixels is minimum units constituting the display area AA. The display element may be disposed in each of the plurality of subpixels. For example, the plurality of subpixels may each include the light-emitting element including an anode, a light-emitting part, and a cathode. However, the present disclosure is not limited thereto. In addition, the drive circuit configured to operate the plurality of subpixels may include driving elements, lines, and the like. For example, the drive circuit may include, but not limited to, a thin-film transistor, a storage capacitor, a gate line, a data line, and the like.

The non-display area NA is an area in which no image is displayed. Various lines and circuits for operating the organic light-emitting element in the display area AA are disposed in the non-display area NA. For example, the non-display area NA may include, but not limited to, link lines for transmitting signals to the plurality of subpixels and the drive circuit in the display area AA. The non-display area NA may include a drive IC such as a gate driver IC and a data driver IC.

Meanwhile, the non-display area NA includes a pad area.

The pad area is an area in which a plurality of pads is disposed. The plurality of pads is electrodes for electrically connecting the plurality of flexible films 130 and the display panel 120. The plurality of flexible films 130 and the display panel 120 may be electrically connected through the plurality of pads. In the non-display area NA, the pad area may be the non-display area NA that overlaps the second area A2 of the upper cover 110a. However, the pad area may be formed in another portion of the non-display area NA in accordance with the arrangement of the plurality of flexible films 130. However, the present disclosure is not limited thereto. Certain features mentioned above are not illustrated to avoid obscuring the concepts of the disclosure.

With reference to FIG. 5, the display panel 120 includes a substrate 121, a buffer layer 122, a pixel part 123, a sealing layer 124, and a sealing substrate 125.

The substrate 121 is a base member for supporting various types of components of the display panel 120 and may be made of an insulating material. The substrate 121 may be made of a material having flexibility so that the display panel 120 can be wound or unwound. For example, the substrate 121 may be made of a plastic material such as polyimide (PI).

The buffer layer 122 is disposed on a top or front surface of the substrate 121. The buffer layer 122 may inhibit moisture and/or oxygen penetrating from the outside of the substrate 121 from being diffused within the display panel 120. The buffer layer 122 may be made of an inorganic material. For example, the buffer layer 122 may be configured as a single layer or multilayer made of silicon oxide (SiOx) or silicon nitride (SiNx), or any combination thereof. However, the present disclosure is not limited thereto.

The pixel part 123 is disposed on the top or front surface of the substrate 121 and a top or front surface of the buffer layer 122. The pixel part 123 includes a plurality of organic light-emitting elements, and a circuit for operating the plurality of organic light-emitting elements. The pixel part 123 may be disposed to correspond to the display area AA.

Meanwhile, the display panel 120 may be a top-emission type display panel or a bottom-emission type display panel depending on a direction in which light is emitted from the organic light-emitting element.

The top-emission type display device allows the light emitted from the organic light-emitting element to propagate toward an upper side of the substrate 121 on which the organic light-emitting element is formed. The top-emission type display device may have a reflective layer formed on a lower portion of the anode in order to allow the light emitted from the organic light-emitting element to propagate toward the upper side of the substrate 121, i.e., toward the cathode.

The bottom-emission type display device allows the light emitted from the organic light-emitting element to propagate toward a lower side of the substrate 121 on which the organic light-emitting element is formed. In the case of the bottom-emission type display device, the anode may be made of only a transparent electrically conductive material and the cathode may be made of a metallic material with high reflectance in order to allow the light emitted from the organic light-emitting element to propagate toward the lower side of the substrate 121.

Hereinafter, for the convenience of description, the display device 100 according to the embodiment of the present disclosure will be described as being the bottom-emission type display device. However, the present disclosure is not limited thereto.

The sealing layer 124 is disposed to cover the pixel part 123. The sealing layer 124 seals the organic light-emitting element of the pixel part 123. The sealing layer 124 may protect the organic light-emitting element of the pixel part 123 from outside moisture, oxygen, impact, and the like. The sealing layer 124 may be formed by alternately stacking a plurality of inorganic layers and a plurality of organic layers. For example, the inorganic layer may be made of an inorganic material such as silicon nitride (SiNx), silicon oxide (SiOx), or aluminum oxide (AlOx). The organic layer may be made of epoxy-based polymer or acrylic polymer. However, the present disclosure is not limited thereto.

The sealing substrate 125 is disposed on the sealing layer 124. Specifically, the sealing substrate 125 is disposed between the sealing layer 124 and the upper cover 110a. The sealing substrate 125, together with the sealing layer 124, may protect the organic light-emitting element of the pixel part 123. The sealing substrate 125 may protect the organic light-emitting element of the pixel part 123 from outside moisture, oxygen, impact, and the like. For example, the sealing substrate 125 may be made of a material having a modulus of elasticity as high as about 200 to 900 MPa. The sealing substrate 125 may be made of a metallic material such as aluminum (Al), nickel (Ni), chromium (Cr), iron (Fe), and an alloy of nickel which is easily machined in the form of a foil or thin-film and has high corrosion resistance. Therefore, because the sealing substrate 125 is made of a metallic material in a preferred embodiment, the sealing substrate 125 may be implemented in the form of an ultrathin-film and have protection characteristics strong against outside impact and scratches.

A bonding layer AD is disposed between the sealing layer 124 and the sealing substrate 125. The bonding layer AD may bond the sealing layer 124 and the sealing substrate 125. The bonding layer AD may be made of a material having bondability or adhesive properties. The bonding layer AD may be a thermosetting or naturally curable bonding agent. For example, the bonding layer AD may be an optical clear adhesive (OCA), a pressure sensitive adhesive (PSA), or the like. However, the present disclosure is not limited thereto.

Meanwhile, the bonding layer AD may be disposed to surround the sealing layer 124 and the pixel part 123. That is, the pixel part 123 may be sealed by the buffer layer 122 and the sealing layer 124. The sealing layer 124 and the pixel part 123 may be sealed by the buffer layer 122 and the bonding layer AD. The bonding layer AD, together with the sealing layer 124 and the sealing substrate 125, may protect the organic light-emitting element of the pixel part 123 from outside moisture, oxygen, impact, and the like. In this case, the bonding layer AD may further include a moisture absorbent. The moisture absorbent may include particles having hygroscopicity. The moisture absorbent may absorb moisture, oxygen, and the like from the outside, thereby minimizing a degree to which moisture and oxygen penetrate into the pixel part 123.

With reference to FIG. 5, a bonding part 190 is disposed to bond the display panel 120 and the upper cover 110a. The bonding part 190 may be disposed between the display panel 120 and the upper cover 110a and bond the display panel 120 and the upper cover 110a. The bonding part 190 may bond the display panel 120 and the upper cover 110a by bonding the scaling substrate 125 and the upper cover 110a. The bonding part 190 may be disposed between the scaling substrate 125 and the upper cover 110a and bond the sealing substrate 125 and the upper cover 110a.

Meanwhile, although not illustrated in the drawings, a polarizing plate may be disposed on the rear surface 120R of the display panel 120. The polarizing plate may selectively transmit light and reduce reflection of external light entering the display panel 120. Specifically, the display panel 120 includes various metallic materials applied to semiconductor elements, lines, organic light-emitting elements, and the like. Therefore, the external light entering the display panel 120 may be reflected by the metallic material. The reflection of external light may decrease visibility of the display device 100. However, in case that the polarizing plate is included in the display device 100, the polarizing plate suppresses the reflection of external light, thereby improving outdoor visibility of the display device 100. However, the polarizing plate may be excluded in accordance with one or more embodiments of the display device 100.

With reference back to FIG. 4B, the plurality of flexible films 130 is disposed at one end, or a bottom end, of the display panel 120. The plurality of flexible films 130 are each a film having various types of components disposed on a base film having flexibility in order to supply signals to the plurality of subpixels constituting the plurality of pixels and to the drive circuit in the display area AA. The plurality of flexible films 130 may be electrically connected to the display panel 120. The plurality of flexible films 130 is disposed at one end, such as a bottom end, of the non-display area NA of the display panel 120 and may supply power voltage, data voltage, and the like to the plurality of subpixels and the drive circuit in the display area AA. Meanwhile, FIG. 4B illustrates eight flexible films 130. However, the number of flexible films 130 may be variously changed in accordance with design and the present disclosure is not limited thereto.

The drive ICs such as gate driver ICs and data driver ICs may be disposed on base films of the plurality of flexible films 130. The drive IC is a component configured to process data for displaying the image and process a driving signal for processing the data. The drive IC may be disposed in ways such as a chip-on-glass (COG) method, a chip-on-film (COF) method, and a tape carrier package (TCP) method depending on how the drive IC is mounted.

Meanwhile, the plurality of flexible films 130 include components such as base films, the data drivers configured to display images on the base films, and the various types of drive ICs configured to control the data drivers. In other words, the plurality of flexible films 130 include components for displaying the images. The plurality of flexible films 130 is electrically connected to the pad area at one end of the display panel 120, such as a bottom end of the display panel 120, and bent toward the rear surface of the upper cover 110a. One end of each of the plurality of flexible films 130 may be connected to one end of the display panel 120 on one surface of the upper cover 110a, and the other end of each of the plurality of flexible films 130 may be disposed on a surface of the upper cover 110a opposite to one surface of the upper cover 110a.

With reference to FIG. 4B, the printed circuit board 140 is disposed on the rear surface of the upper cover 110a and connected to the plurality of flexible films 130. That is, the printed circuit board 140 disposed adjacent to the rear surface of the upper cover 110a and electrically connected to the plurality of flexible films 130. The printed circuit board 140 is a component configured to supply a signal to the drive IC of each of the plurality of flexible films 130. Various types of components for supplying the drive IC with various signals such as driving signals, data signals, and the like may be disposed on the printed circuit board 140. Meanwhile, FIG. 4B illustrates two printed circuit boards 140. However, the number of printed circuit boards 140 may be variously changed in accordance with design. The present disclosure is not limited thereto.

Meanwhile, although not illustrated in FIG. 4B, an additional printed circuit board connected to the printed circuit board 140 may be further disposed. For example, the printed circuit board 140 may be called a source printed circuit board (source PCB (S-PCB)) on which a data drive part is mounted. The additional printed circuit board connected to the printed circuit board 140 may be called a control printed circuit board (control PCB (C-PCB)) on which the timing controller and the like are mounted. The additional printed circuit board may be disposed in the roller 161, disposed on the housing part HP outside the roller 161, or disposed to directly adjoin the printed circuit board 140.

Hereinafter, the upper cover 110a will be described in more detail with reference to FIGS. 6A to 6C.

Upper Cover

Figure 6A:
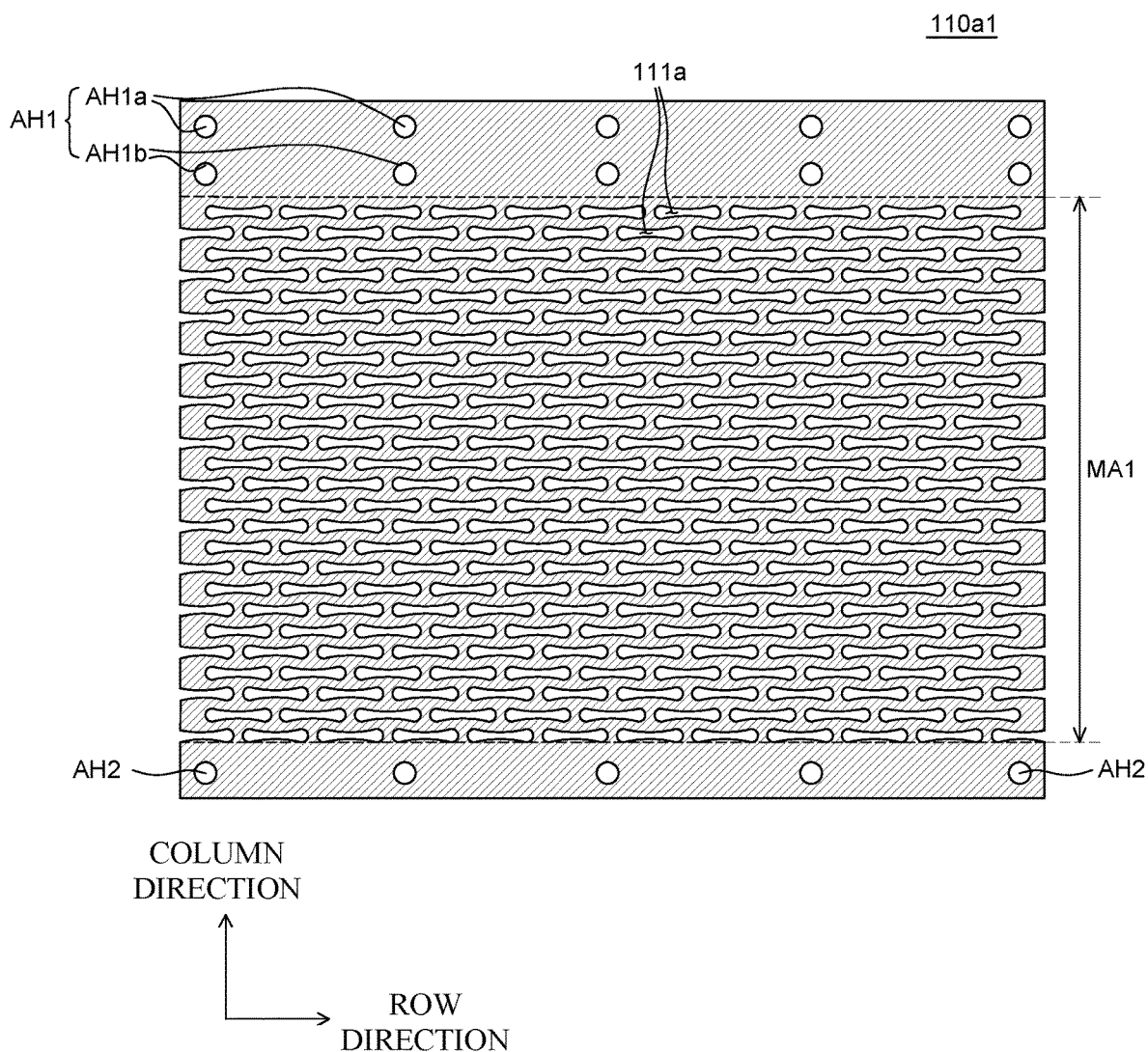
FIG. 6A is an elevational view of a first upper cover of the display device of FIG. 1A.

FIG. 6A is an elevational view of the first upper cover 110a1 of the display device 100 according to one or more embodiments of the present disclosure. FIG. 6B is an elevational view of the second upper cover 110a2 of the display device 100 according to one or more embodiments of the present disclosure. FIG. 6C is a schematic cross-sectional view of the upper cover 110a of the display device 100 according to one or more embodiments of the present disclosure. For convenience of illustration, FIG. 6C does not illustrate the opening portion 111.

The upper cover 110a includes the first upper cover 110a1 and the second upper cover 110a2.

The first upper cover 110a1 is disposed on the rear surface 120R (FIG. 5) of the display panel 120 and supports the display panel 120 or is configured to support the display panel 120.

With reference to FIG. 6A, the first upper cover 110a1 includes the plurality of first fastening holes AH1 disposed in the area corresponding to the first area A1 of the upper cover 110a. The plurality of first fastening holes AH1 of the first upper cover 110a1 is disposed to fix the head bar 172, the upper cover 110a, and the display panel 120. Therefore, the plurality of first fastening holes AH1 of the first upper cover 110a1 may be disposed at positions corresponding to a plurality of fastening members, which may be various fasteners, such as screws, bolts, and the like, that fixes the head bar 172, the upper cover 110a, and the display panel 120. For example, in case that the plurality of fastening members is disposed in first and second rows, the first fastening holes AH1 of the first upper cover 110a1 may include the plurality of first upper fastening holes AH1a disposed in the first row while corresponding to the positions of the plurality of fastening members, and the plurality of first lower fastening holes AH1b disposed in the second row. In addition, when the plurality of fastening members each has a circular cross-sectional shape, the first fastening hole AH1 of the first upper cover 110a1 may be disposed to have a circular shape corresponding to the cross-sectional shape of each of the plurality of fastening members.

Next, the first upper cover 110a1 includes the second fastening holes AH2 disposed in the area corresponding to the second area A2 of the upper cover 110a. The second fastening holes AH2 of the first upper cover 110a1 may be holes for fixing the lower cover 110b and the upper cover 110a.

With reference to FIG. 6A, the first upper cover 110a1 may include a first flexible area MA1 in an area corresponding to the third area A3 of the upper cover 110a. The first flexible area MA1 of the first upper cover 110a1 includes a plurality of first opening portions 111a. The plurality of first opening portions 111a may be disposed in adjacent rows in a staggered manner. For example, the plurality of first opening portions 111a disposed in one or a first row and the plurality of first opening portions 111a disposed in a second row adjacent to the first row are disposed in a staggered manner. Specifically, centers of the plurality of first opening portions 111a disposed in odd-numbered rows and centers of the plurality of first opening portions 111a disposed in even-numbered rows may be disposed in a staggered manner. For example, the plurality of first opening portions 111a may be disposed to be staggered by ½ of a width of the first opening portion 111a in the row direction, although the disclosure is not limited thereto.

When the first upper cover 110a1 is wound, the first upper cover 110a1 may be curved in the column direction of the upper cover 110a, and stress may be applied so that the plurality of first opening portions 111a is stretched in the column direction. A width of each of the plurality of first opening portions 111a in the row direction may be increased to allow the third area A3 of the upper cover 110a to be easily wound or unwound, thereby mitigating stress applied to the third area A3. Therefore, the third area A3 of the first upper cover 110a1 may be referred to as a flexible area.

However, the arrangement of the plurality of first opening portions 111a illustrated in FIG. 6A is an example, and the present disclosure is not limited thereto. For example, FIG. 6A illustrates that the plurality of first opening portions 111a each has a dumbbell shape. However, the present disclosure is not limited thereto. The plurality of first opening portions 111a may have various shapes such as a polygonal shape or an elliptical shape.

The first upper cover 110a1 may be made of a material having rigidity. However, at least a part of the first upper cover 110a1 may have flexibility so as to be wound or unwound together with the display panel 120. For example, the first upper cover 110a1 may be made of a metallic material such as stainless steel (steel use stainless (SUS)) or Invar or a plastic material. However, the material of the first upper cover 110a1 may be variously changed in accordance with design as long as the material of the first upper cover 110a1 satisfies physical property conditions such as a thermal deformation amount, a radius of curvature, rigidity, and the like. However, the present disclosure is not limited thereto.

The second upper cover 110a2 is disposed on a rear surface 110R (FIG. 5) of the first upper cover 110a1 and supports the display panel 120 and the first upper cover 110a1.

The second upper cover 110a2 may be disposed in the area corresponding to the first area A1 of the upper cover 110a and have a smaller size than the first upper cover 110a1. For example, a length of the second upper cover 110a2 in the column direction may be shorter than a length of the first upper cover 110a1 in the column direction. Therefore, an upper end of the second upper cover 110a2 may be disposed below an upper end of the first upper cover 110a1.

Figure 6B:
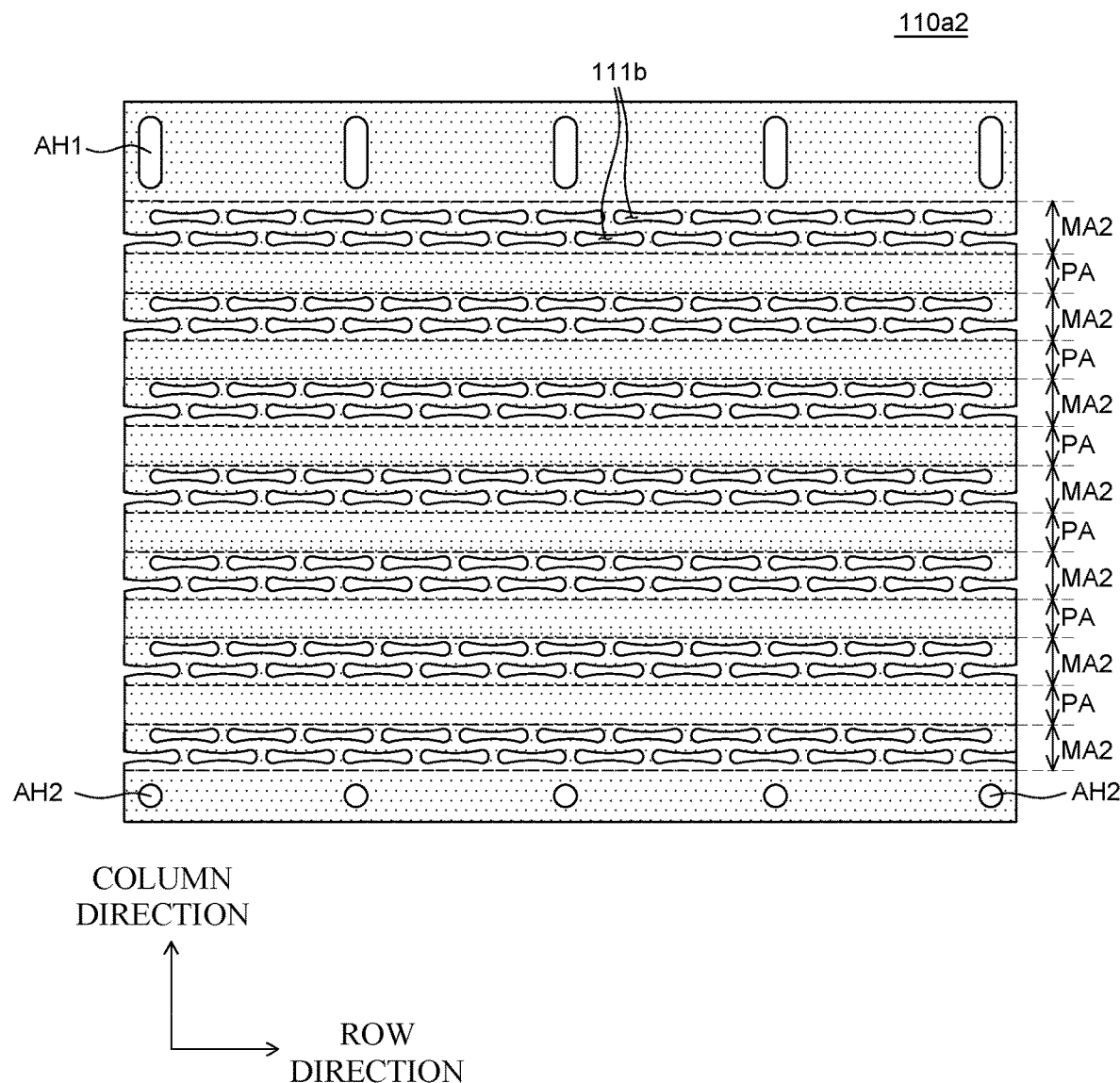
FIG. 6B is an elevational view of a second upper cover of the display device of FIG. 1A.

With reference to FIG. 6B, the second upper cover 110a2 includes the first fastening holes AH1 disposed in the area corresponding to the first area A1 of the upper cover 110a. The first fastening holes AH1 of the second upper cover 110a2 may be disposed in an area corresponding to some of the first fastening holes AH1 of the first upper cover 110a1. For example, the first fastening holes AH1 of the second upper cover 110a2 may be disposed only in the area corresponding to the first lower fastening holes AH1 of the first upper cover 110a1.

The first fastening hole AH1 of the second upper cover 110a2 may be different in shape from the first fastening hole AH1 of the first upper cover 110a1. For example, as illustrated in FIG. 6B, the first fastening hole AH1 of the second upper cover 110a2 may have a shape having a width in the upward and downward direction larger than a width in the leftward and rightward direction. In other words, the first fastening hole AH1 or first fastening holes AH1 of the second upper cover 110a2 may have a height in the column direction that is greater than a width in the row direction according to the orientation of FIG. 6B. That is, the first fastening hole 110a1 may have a shape having a relatively large width in a direction in which the display panel 120 is wound. The first fastening hole AH1 of the second upper cover 110a2 will be described below in detail with reference to FIG. 7.

Meanwhile, FIG. 6B illustrates that the first fastening hole AH1 of the second upper cover 110a2 is disposed only in the area corresponding to some of the first fastening holes AH1 of the first upper cover 110a1. However, the present disclosure is not limited thereto. The second upper cover 110a2 may include the first fastening holes AH1 disposed at the positions corresponding to the plurality of fastening members, and the first upper cover 110a1 may include the first fastening holes AH1 corresponding to some of the plurality of fastening members. In this case, the first fastening hole AH1 of the first upper cover 110a1 may have a shape having a width in the upward/downward direction larger than a width in the leftward/rightward direction.

Next, the second upper cover 110a2 includes the second fastening holes AH2 disposed in the area corresponding to the second area A2 of the upper cover 110a. In FIG. 6B, the second fastening holes AH2 of the second upper cover 110a2 may be holes for fixing the lower cover 110b and the upper cover 110a.

In the area corresponding to the third area A3 of the upper cover 110a, the second upper cover 110a2 includes a plurality of second flexible areas MA2, and a plurality of support areas PA disposed between the plurality of second flexible areas MA2. That is, in the area corresponding to the third area A3 of the upper cover 110a, the plurality of second flexible areas MA2 and the plurality of support areas PA of the second upper cover 110a2 may be alternately disposed.

First, the second flexible area MA2 of the second upper cover 110a2 may include a plurality of second opening portions 111b. A shape of each of the plurality of second opening portions 111b may be identical to a shape of the first opening portion 111a of the first upper cover 110a1, or may be different. That is, a size of each of the plurality of second opening portions 111b may be equal to a size of each of the plurality of first opening portions 111a. In this case, the configuration in which the second opening portion 111b and the first opening portion 111a have the equal size may mean that an area occupied by the second opening portion 111b and an area occupied by the single first opening portion 111a are equal to each other in a plan or elevational view. However, the present disclosure is not limited thereto.

In addition, a center of each of the plurality of first opening portions 111a and a center of each of the plurality of second opening portions 111b may be coincident with each other. Therefore, the first opening portion 111a and the second opening portion 111b may completely overlap each other. In the area in which the first opening portion 111a and the second opening portion 111b overlap each other, an object disposed rearward of the second upper cover 110a2 may be visually recognized from a front surface of the first upper cover 110a1 through the first opening portion 111a and the second opening portion 111b. Therefore, the plurality of first opening portions 111a and the plurality of second opening portions 111b may define the opening portions 111.

The plurality of support areas PA of the second upper cover 110a2 is disposed between the plurality of second flexible areas MA2. The plurality of support areas PA of the second upper cover 110a2 disposed on the rear surface of the first upper cover 110a1, may support the first upper cover 110a1.

The plurality of opening portions, which is disposed in the plurality of second flexible areas MA2 of the second upper cover 110a2, is not disposed in the plurality of support areas PA. Therefore, the plurality of second opening portions 111b may overlap some, but not all, of the plurality of first opening portions 111a in the first upper cover 110a1 in some embodiments.

The plurality of support areas PA of the second upper cover 110a2 may overlap the first opening portion 111a of the first upper cover 110a1. In the areas that overlap the plurality of support areas PA of the second upper cover 110a2, a support area PA or a portion of the support area PA of the second upper cover 110a2 may be exposed in a shape corresponding to the first opening portion 111a of the first upper cover 110a1.

Like the first upper cover 110a1, the second upper cover 110a2 may be made of a material having rigidity but have flexibility so as to be wound or unwound together with the display panel 120. For example, the second upper cover 110a2 may be made of a metallic material such as stainless steel (steel use stainless (SUS)) or Invar or a plastic material. However, the present disclosure is not limited thereto.

Figure 6C:
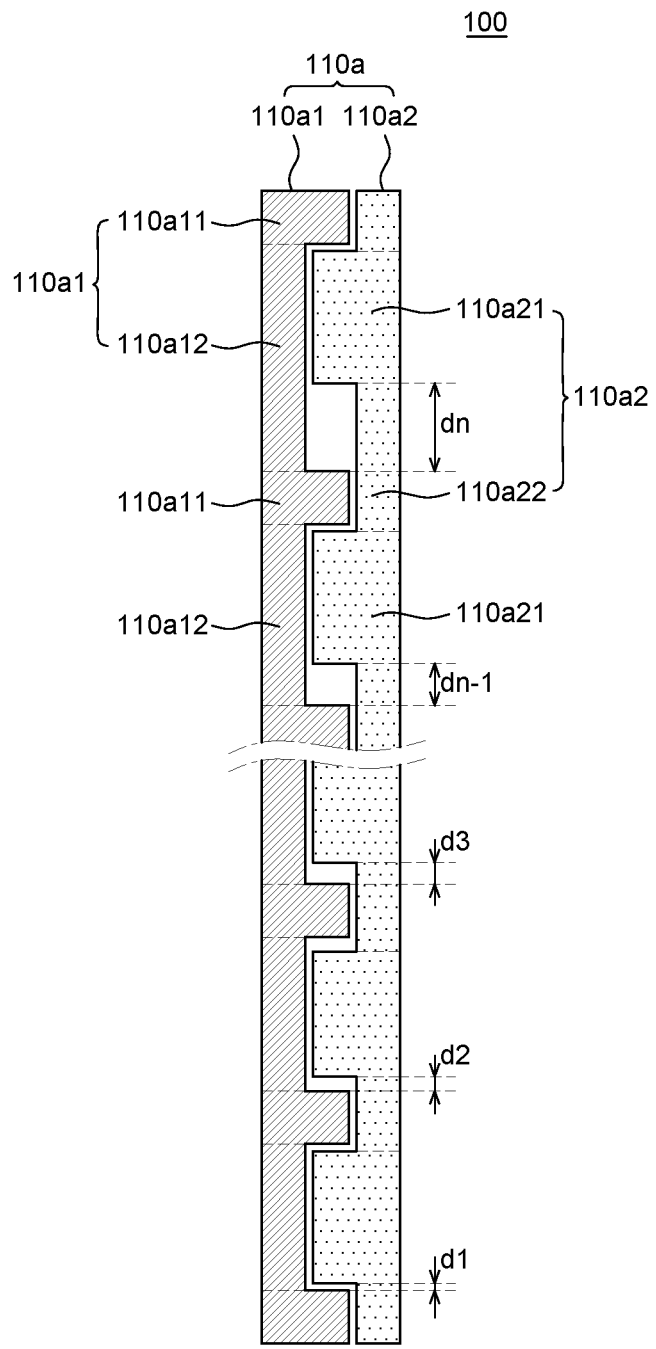
FIG. 6C is a schematic cross-sectional view of the upper cover of the display device of FIG. 4A.

With reference to FIG. 6C, the first upper cover 110a1 includes a plurality of convex portions 110a11 and a plurality of concave portions 110a12. The plurality of convex portions 110a11 and the plurality of concave portions 110a12 may each be disposed in the row direction. The convex portion 110a11 of the first upper cover 110a1 is disposed between the plurality of concave portions 110a12 and protrudes in a direction in which the second upper cover 110a2 is disposed.

With reference to FIG. 6C, the second upper cover 110a2 includes a plurality of convex portions 110a21 and a plurality of concave portions 110a22. The plurality of convex portions 110a21 and the plurality of concave portions 110a22 of the second upper cover 110a2 may each be disposed in the row direction. The plurality of convex portions 110a21 of the second upper cover 110a2 is disposed between the plurality of concave portions 110a22 and protrudes in a direction in which the first upper cover 110a1 is disposed. In one or more embodiments, the convex portions 110a11 of the first upper cover 110a1 are implemented as protrusions or ridges that extend from the first upper cover 110a1 toward the second upper cover 110a2. The concave portions 110a12 of the first upper cover 110a1 are implemented as channels or cavities that extend into the first upper cover 110a, i.e., away from the second upper cover 110a2, and are positioned between the convex portions 110a11 to define a space or gap between the convex portions 110a11. The second upper cover 110a2 has an opposite arrangement configured to mate and interface with the first upper cover 110a1, namely convex portions 110a21 that extend toward the first cover 110a1 and are received in the channels or cavities defined by the concave portions 110a12 of the first upper cover 110a1. The second upper cover 110a2 further includes concave portions 110a22 implemented as channels or cavities that receive the convex portions 110a11 of the first upper cover 110a1. Except as otherwise noted, the convex portions 110a11, 110a21 of both of the first and second upper covers 110a1, 110a2 have a thickness or width relative to the respective upper cover 110a1, 110a2 that is greater than a thickness of the concave portions 110a12, 110a22 of the first and second upper covers 110a1, 110a2.

In this case, the plurality of concave portions 110a22 and the plurality of convex portions 110a21 of the second upper cover 110a2 and the plurality of concave portions 110a12 and the plurality of convex portions 110a11 of the first upper cover 110a1 may be disposed in a staggered manner. In addition, a width or height of each of the plurality of concave portions 110a22 of the second upper cover 110a2 may be larger than a width or height of each of the plurality of convex portions 110a11 of the first upper cover 110a1. A width or height of each of the plurality of concave portions 110a12 of the first upper cover 110a1 may be larger than a width or height of each of the plurality of convex portions 110a21 of the second upper cover 110a2. Therefore, the plurality of concave portions 110a12 and the plurality of convex portions 110a11 of the first upper cover 110a1 are disposed to engage with the plurality of concave portions 110a22 and the plurality of convex portions 110a21 of the second upper cover 110a2.

A difference in width or height between the plurality of concave portions 110a12 of the first upper cover 110a1 and the plurality of convex portions 110a21 of the second upper cover 110a2, which correspond to one another, and a difference in width or height between the plurality of concave portions 110a22 of the second upper cover 110a2 and the plurality of convex portions 110a11 and the first upper cover 110a1, which correspond to one another may increase in a direction from a lower side of the upper cover 110a adjacent to the roller 161 to an upper side of the upper cover 110a, as generally indicated by dimensions d1, d2, d3, dn−1, and dn. The increase in the gap or space between the convex portions 110a11 of the first upper cover 110a1 and the convex portions 110a21 of the second upper cover 110a2 over the height of the upper cover 110a assists with accounting for, and reducing, a slip phenomenon that may occur as the display device 100 is roller and unrolled. In general, as the display device 100 is wound about the roller 161, the layers of the display device 100 closest to the roller 161 are wound by a distance (i.e., have a circumference) that is less than a winding distance (i.e., a circumference) of the layers furthest from the roller 161 because of the thickness of the layers of the display device 100. Thus, the layers can tend to slip relative to one another to offset the difference in winding amount and cause damage to the display device 100. This issue is more pronounced at the top of the display device 100 because as the roller 161 winds the display device 100, the overall circumference of the roll increases with each revolution about the roller 161.

In one or more embodiments of the disclosure, the spaces or gaps between convex portions 110a11, 110a21 of the first and second upper covers 110a1, 110a2 increases (as shown by dimensions d1 . . . dn) to account for, and reduce this slip phenomenon. The gaps or spaces enable deformation and/or movement of the first cover 110a1 relative to the second cover 110a2 that relieves stress produced by the slip phenomenon and reduces the likelihood of damage to the display device 100.

Hereinafter, fastening structures between the concave portion 110a12 and the convex portion 110a11 of the first upper cover 110a1, the concave portion 110a22 and the convex portion 110a21 of the second upper cover 110a2, and the head bar 172 will be described in more detail with reference to FIG. 7.

Figure 7:
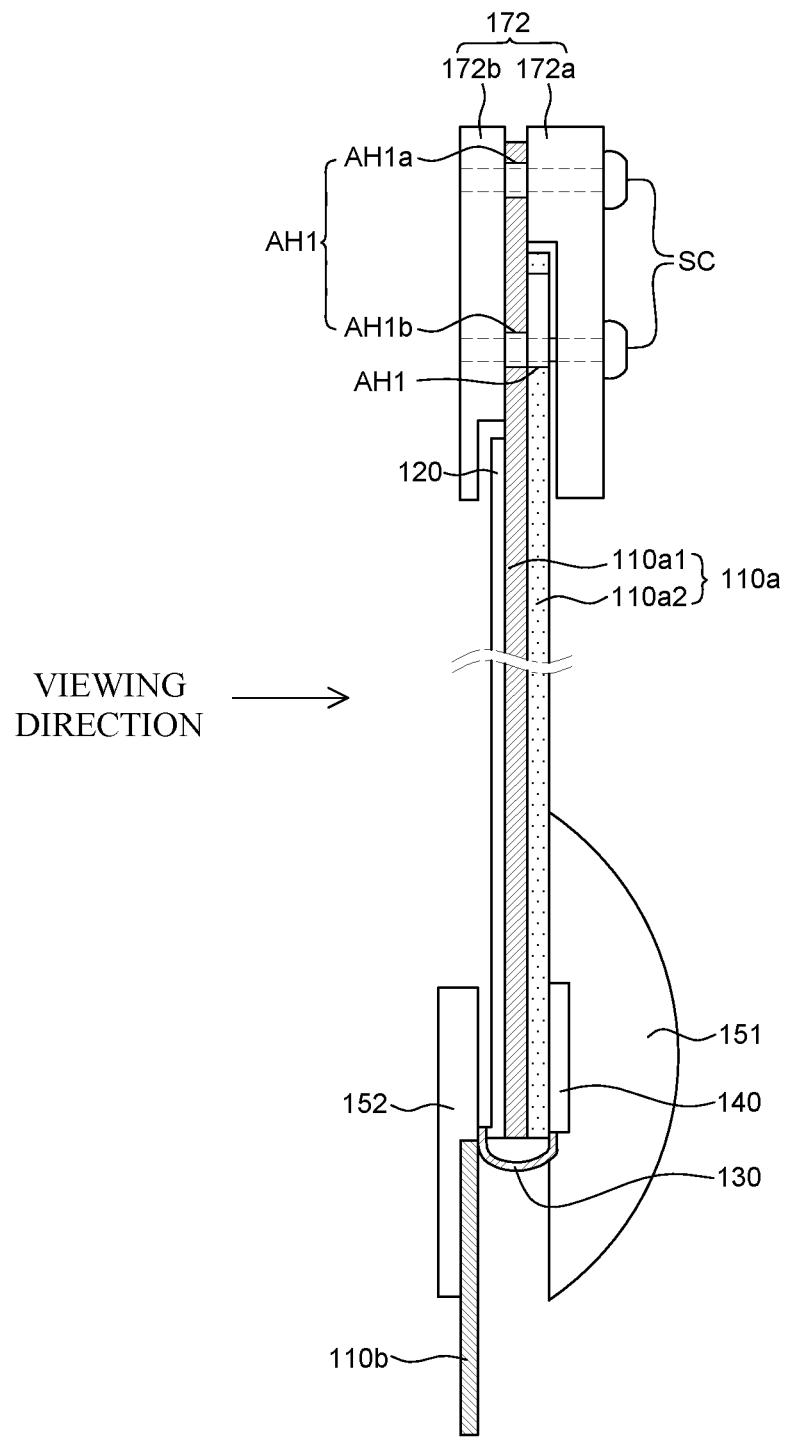
FIG. 7 is a schematic cross-sectional view of a head bar and a display panel of the display device of FIG. 1A.

FIG. 7 is a schematic cross-sectional view for explaining the head bar 172 and the display panel 120 of the display device 100 according to one or more embodiments of the present disclosure. FIG. 7 illustrates only the head bar 172, the display panel 120, the upper cover 110a, the lower cover 110b, a top cover 151, the flexible film 130, and the printed circuit board 140. In addition, for convenience of illustration, FIG. 7 does not illustrate the concave portion 110a12 and the convex portion 110a11 of the first upper cover 110a1 and the concave portion 110a22 and the convex portion 110a21 of the second upper cover 110a2.

The top cover 151 is disposed on one surface of the upper cover 110a, such as a rear surface of the upper cover 110a relative to the viewing direction shown in FIG. 7. The top cover 151 may be disposed to cover the pad area of the display panel 120, the plurality of flexible films 130, and the printed circuit board 140 and protect the pad area of the display panel 120, the plurality of flexible films 130, and the printed circuit board 140.

The top cover 151 may be made of a material having rigidity, such that the top cover 151 may not be deformed when the display part DP is wound. The top cover 151 may protect the pad area and the plurality of flexible films 130 at one end of the display panel 120.

An outer surface of the top cover 151 may have a convex shape and be connected to a curved surface portion 161R of the roller 161, thereby defining a rounded shape or defining a circular shape connected to the curved surface portion 161R of the roller. That is, one surface of the top cover 151 may be formed as a curved surface. Further, when the display panel 120 is wound, the top cover 151 may define a rounded shape connected to the curved surface portion 161R of the roller 161 or define a circular shape connected to the curved surface portion 161R of the roller.

With reference to FIG. 7, the head bar 172 includes a first head bar 172a and a second head bar 172b. The second head bar 172b covers the front surface of the display panel 120. The second head bar 172b may cover only a part of the front surface of the display panel 120 adjacent to the edge of the uppermost end of the display panel 120 so as not to cover an image displayed on the front surface of the display panel 120.

With reference to FIG. 7, a bottom cover 152 may be disposed on the display panel 120. The bottom cover 152, together with the top cover 151, may protect the pad area of the display panel 120, the plurality of flexible films 130, and the printed circuit board 140.

With reference to FIG. 7, the display device 100 is wound in an inward manner in which a display surface of the display panel 120 is directed toward the roller 161. That is, in case that the display panel 120 is wound around the roller 161, the display panel 120 may be disposed to be closer to the roller 161 than the upper cover 110a to the roller 161. As illustrated in FIG. 7, a viewing direction may be a direction directed toward the display panel 120 from the bottom cover 152 instead of the top cover 151.

With reference back to FIG. 6C, the plurality of convex portions 110a21 of the second upper cover 110a2 is disposed closer to the convex portions 110a11 of the first upper cover 110a1, which are disposed at the upper side among the plurality of concave portions 110a12 of the first upper cover 110a1, than the convex portions 110a11 of the first upper cover 110a1 that are disposed at the lower side among the plurality of concave portions 110a12 of the first upper cover 110a1.

As described above, in case that the display device 100 is wound in an inward manner, the display device 100 is wound so that the first upper cover 110a1 is closer to the roller 161 than the second upper cover 110a2 to the roller 161. Therefore, the display device 100 is wound with the display panel 120 having a smaller radius of curvature than the upper cover 110a generally, and with the first upper cover 110a having a smaller radius of curvature than the second upper cover 110a2. Therefore, a relatively small slip occurs on the first upper cover 110a1 in comparison with the second upper cover 110a2. Further, the position of the first upper cover 110a1 is less changed than the position of the second upper cover 110a2. That is, during the winding process, an upper end of the second upper cover 110a2 may be further moved downward than an upper end of the first upper cover 110a1. Therefore, the plurality of convex portions 110a21 of the second upper cover 110a2 may be further moved downward than the plurality of concave portions 110a12 of the first upper cover 110a1. Therefore, spacing distances (d1, d2, . . . , dn−1, and dn) may be ensured and increasing over a height of the upper cover 110a between the convex portion 110a21 of the second upper cover 110a2 and the convex portion 110a11 of the first upper cover 110a1, thereby accommodating a slip of the convex portion 110a21 of the second upper cover 110a2.

With reference back to FIG. 6C, the spacing distances (d1, d2, . . . , dn−1, and dn) between the convex portion 110a21 of the second upper cover 110a2 and the convex portion 110a11 of the first upper cover 110a1 may increase as the distance from the roller 161 increases. With reference to FIG. 6C, at the lower side of the upper cover 110a adjacent to the roller 161, the convex portion 110a11 of the first upper cover 110a1 is spaced apart from the convex portion 110a21 of the second upper cover 110a2 at a predetermined interval. For example, a spacing distance d1 between the convex portion 110a21 of the second upper cover 110a2 and the convex portion 110a11 of the first upper cover 110a1 may correspond to an assembling tolerance. Therefore, even though a process error occurs, the second upper cover 110a2 may engage with the first upper cover 110a1 without separating from the first upper cover 110a1. Meanwhile, a spacing distance (dn) between the convex portion 110a21 of the second upper cover 110a2 and the convex portion 110a11 of the first upper cover 110a1 at the upper side of the upper cover 110a, which is disposed to be distant from the roller 161, may be longer than a distance (dn, dn2, . . . , dn−1) between the convex portion 110a21 of the second upper cover 110a2 and the convex portion 110a11 of the first upper cover 110a1 at the lower side of the upper cover 110a. That is, the spacing distances (dn, dn2, . . . , dn−1) between the convex portion 110a21 of the second upper cover 110a2 and the convex portion 110a11 of the first upper cover 110a1 may increase in a direction from the roller 161 to the head bar 172. Therefore, a slip of the second upper cover 110a2 may be accommodated by increasing the spacing distances (dn, dn2, . . . , dn−1) between the convex portion 110a21 of the second upper cover 110a2 and the convex portion 110a11 of the first upper cover 110a1 over a height of the upper cover 110a, and most pronounced at the upper side of the upper cover 110a at which a radius between the roller 161 and the display panel 120 increases.

Meanwhile, the first opening portions 111a may be disposed in all the plurality of convex portions 110a11 and the plurality of concave portions 110a12 of the first upper cover 110a1 (see FIG. 6A). Therefore, all the plurality of convex portions 110a11 and the plurality of concave portions 110a12 of the first upper cover 110a1 may be the first flexible area MA1.

In contrast, the second opening portions 111b of the second upper cover 110a2 (sec FIG. 6B) may be disposed in one area of the plurality of concave portions 110a22, or the plurality of convex portions 110a21 of the second upper cover 110a2, or disposed in a partial area of the plurality of concave portions 110a22 and a partial area of the plurality of convex portions 110a21. Therefore, the plurality of concave portions 110a22 and the plurality of convex portions 110a21 of the second upper cover 110a2 may each correspond to the second flexible area MA2 and the support area PA of the second upper cover 110a2. However, the present disclosure is not limited thereto. The plurality of concave portions 110a22 and the plurality of convex portions 110a21 of the second upper cover 110a2 may correspond to a partial area of the support area PA or a partial area of the second flexible area MA2. That is, the arrangement position of the second opening portion 111b of the second upper cover 110a2 may be designed independently regardless of the arrangement of the plurality of concave portions 110a22 and the plurality of convex portions 110a21 of the second upper cover 110a2.

With reference to FIGS. 6A and 7, the head bar 172 is disposed at the uppermost end of the display panel 120 and surrounds the front and rear surfaces of the display panel 120.

Fastening members SC are disposed to penetrate the first fastening holes AH1, the head bar 172, and the first fastening holes AH1 to fasten the head bar 172 to the uppermost end area of the upper cover 110a. Therefore, when the link part 171 fastened to the head bar 172 moves upward or downward, the upper cover 110a and the display panel 120 attached to the upper cover 110a may move upward or downward.

First, with reference to FIGS. 6A and 7, the first fastening holes AH1 of the first upper cover 110a1 include the first upper fastening holes AH1a disposed in the first row, and the first lower fastening holes AH1b disposed in the second row.

The first fastening hole AH1 of the first upper cover 110a1 may be disposed at a position corresponding to the fastening member SC and have a size corresponding to a size of each of the plurality of fastening members SC. Therefore, the first upper cover 110a1 is fixed to the head bar 172 by the fastening member SC, such that the end of the first upper cover 110a1 moves upward or downward together with the head bar 172 when the link part 171 moves upward or downward.

Next, with reference to FIGS. 6B and 7, the first fastening holes AH1 of the second upper cover 110a2 may be disposed at the positions corresponding to some of the plurality of fastening members SC and each have a width in the upward and downward direction larger than a width in the leftward/rightward direction. In this case, as illustrated in FIG. 7, when the display panel 120 is fully unwound, the plurality of fastening members SC is disposed adjacent to lower sides of the first fastening holes AH1 of the second upper cover 110a2.

Meanwhile, because the first upper cover 110a1 is wound to be closer to the roller 161 than the second upper cover 110a2 to the roller 161, a relatively small slip occurs on the first upper cover 110a1 in comparison with the second upper cover 110a2. Therefore, during the winding process, the upper end of the second upper cover 110a2 may be further moved downward than the upper end of the first upper cover 110a1. Therefore, the first fastening hole AH1 of the second upper cover 110a2 is formed to be long in the upward and downward direction, and the fastening member SC may move to the upper side of the first fastening hole AH1 of the second upper cover 110a2 during the process of winding the display panel 120, thereby accommodating the movements of the plurality of fastening members SC during the winding process. In other words, the comparatively longer or taller shape of the first fastening hole AH1 of the second upper cover 110a2 enables movement of the fastening members SC during winding or unwinding to account for additional slip of the second upper cover 110a2 that can result from the second upper cover 110a2 being positioned further from the roller 161 and therefore having a greater radius of curvature than the first upper cover 110a1.

In addition, with reference to FIG. 7, the upper end and the side surface of the second upper cover 110a2 is disposed to be spaced apart from the head bar 172. As described above, because a slip may occur on the second upper cover 110a2 during the process of winding and unwinding the display panel 120, the upper end of the second upper cover 110a2 may be spaced apart from the head bar 172, thereby suppressing friction generated in the event of a slip.

The plurality of opening portions 111 is disposed on the upper cover 110a for supporting the display panel 120 to minimize a slip of the display panel and reduce stress applied to the display panel when the display panel is wound or unwound. However, the time and costs required for the process of forming the opening portions in the upper cover may increase in accordance with a thickness of the upper cover. For example, in case that the opening portion of the upper cover is formed by an etching process, the etching process time and process costs may increase as the thickness of the upper cover increases. In addition, in case that the opening portion is formed by the etching process, the area of the opening portion to be etched may increase as the thickness of the upper cover increases. Therefore, the area of the opening portion of the upper cover increases, which may cause a problem, in which the opening portion of the upper cover is visually recognized by the user, and cause a process deviation in the etching direction.

A general polarizing plate includes a polarizing layer configured as a polyvinyl alcohol (PVA) based polymer film to polarize the entering light. However, because the polyvinyl alcohol (PVA) based polymer material is a material having excellent hygroscopicity, a volume varies depending on humidity. That is, the polarizing layer expands by absorbing moisture in an environment with high humidity, and the polarizing layer contracts by discharging moisture in an environment with low humidity, such that bending occurs in an expansion/contraction direction. Therefore, the polarizing plate and the display panel, to which the polarizing plate is attached, are bent.

In the display device 100 according to one or more embodiments of the present disclosure, the upper cover 110a includes the first and second upper covers 110a1 and 110a2 having a small thickness. In other words, each of the first and second upper covers 110a1, 110a2 may have a thickness that is less than a thickness of an upper cover that is a single, unitary, integral sheet. Further, in some embodiments, the sum of the thickness of the first and second upper covers 110a, 110a2 may be less than a thickness of an upper cover that is a single sheet. Therefore, the first opening portion 111a of the first upper cover 110a1 and the second opening portion 111b of the second upper cover 110a2 may be formed by independent processes. Despite the opening portions 111a, 11b being formed independently, the time for which the etching process is performed to form the first opening portion 111a in the first upper cover 110a1 and the time for which the etching process is performed to form the second opening portion 111b in the second upper cover 110a2 may be shorter than the time for which the etching process is performed to form the opening portion in an upper cover that is a single sheet having a thickness that is a sum of the thickness of the first upper cover 110a1 and the thickness of the second upper cover 110a2. In addition, the opening portion 111 having a smaller size may be formed in the case in which the opening portions are respectively formed in the first upper cover 110a1 and the second upper cover 110a2 in comparison with the case in which the opening portions are formed in the entire single upper cover having the thickness that is the sum of the thickness of the first upper cover 110a1 and the thickness of the second upper cover 110a2. Therefore, in the display device 100 according to one or more embodiments of the present disclosure, the first opening portion 111a of the first upper cover 110a1 and the second opening portion 111b of the second upper cover 110a2 are formed by the independent processes. Therefore, it is possible to minimize the area of the opening portion 111 without reducing a final thickness of the upper cover 110a. Therefore, it is possible to maintain rigidity of the display device 100 and solve the problem in which the opening portion 111 is visually recognized by the user even in embodiments that do not include a polarizing layer.

In addition, in the display device 100 according to one or more embodiments of the present disclosure, the second upper cover 110a2 includes the plurality of support areas PA disposed between the plurality of second flexible areas MA2. Therefore, the upper cover may have rigidity in comparison with a case in which the entire surface of the upper cover is configured as the flexible area including the opening portions. In addition, in case that the upper cover 110a includes the plurality of covers that engages with each other, the upper cover 110a may have high rigidity with respect to the thickness in comparison with the case in which the upper cover 110a is configured as a single cover. Therefore, in the display device 100 according to one or more embodiments of the present disclosure, it is possible to improve bending of the display device 100, which may be caused by expansion of the polarizing plate, and inhibit the opening portion 111 from being visually recognized.

In addition, the display device 100 according to one or more embodiments of the present disclosure is disposed so that a difference in width or height between the plurality of concave portions 110a12 of the first upper cover 110a1 and the plurality of convex portions 110a21 of the second upper cover 110a2, which correspond to one another, and a difference in width or height between the plurality of concave portions 110a22 of the second upper cover 110a2 and the plurality of convex portions 110a11 and the first upper cover 110a1, which correspond to one another may increase in a direction from a lower side of the upper cover 110a adjacent to the roller 161 to an upper side of the upper cover 110a, i.e., over a height or length of the upper cover 110a. In addition, in the display device 100 according to one or more embodiments of the present disclosure, in case that the display panel 120 is wound around the roller 161, the plurality of convex portions 110a21 of the second upper cover 110a2 is disposed closer to the convex portions 110a11 of the first upper cover 110a1, which are disposed at the upper side among the plurality of concave portions 110a12 of the first upper cover 110a1, than the convex portions 110a11 of the first upper cover 110a1 that are disposed at the lower side among the plurality of concave portions 110a12 of the first upper cover 110a1. Therefore, it is possible to accommodate the movements of the plurality of convex portions 110a21 of the second upper cover 110a2 that may be caused by a slip of the second upper cover 110a2. Therefore, in the display device 100, it is possible to reduce a problem in which the display panel 120 is lifted up or the display panel 120 is creased.

Figure 8:
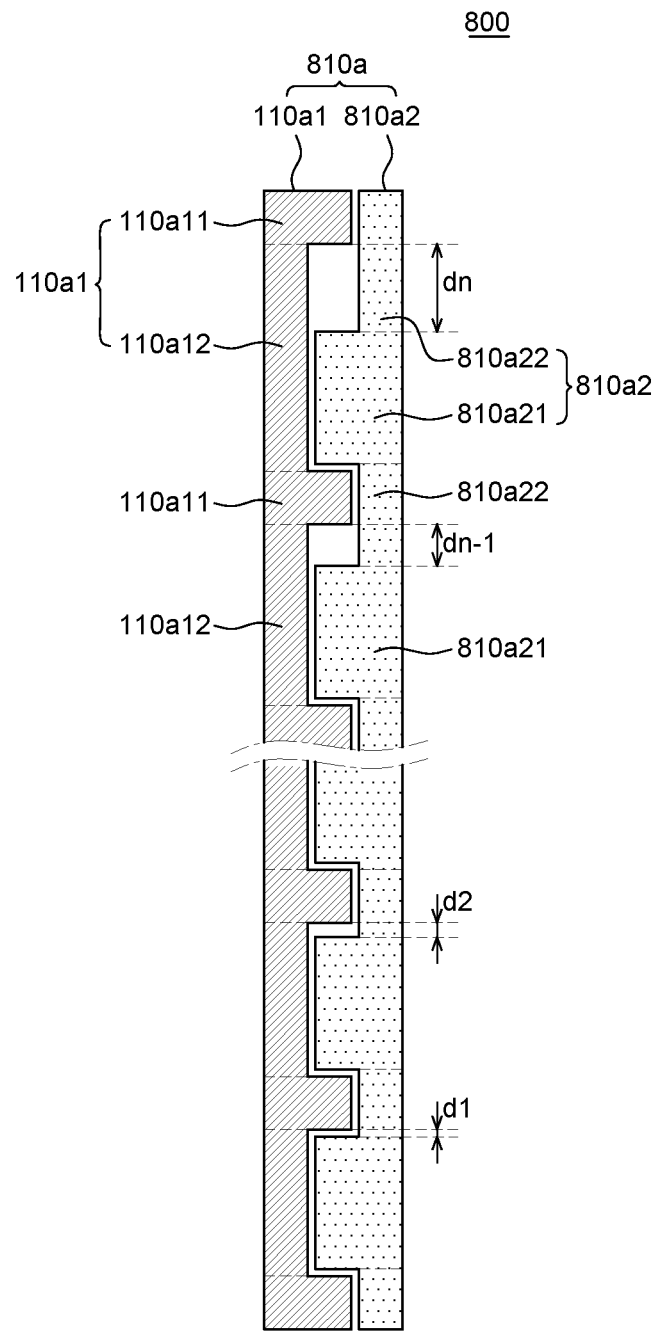
FIG. 8 is a schematic cross-sectional view of an upper cover of a display device according to an embodiment of the present disclosure.

FIG. 8 is a schematic cross-sectional view of an upper cover 810a of a display device 800 according to one or more embodiments of the present disclosure. The upper cover 810a of the display device 800 in FIG. 8 is substantially identical in configuration to the upper cover 110a of the display device 100 in FIGS. 1 to 7, except for only a plurality of convex portions 810a21 and a plurality of concave portions 810a22 of a second upper cover 810a2. Therefore, repeated descriptions of the identical components will be omitted. For convenience of illustration, FIG. 8 illustrates only the upper cover 810a among various constituent elements of the display device 800.

With reference to FIG. 8, the second upper cover 810a2 includes the plurality of convex portions 810a21 and the plurality of concave portions 810a22. The plurality of convex portions 810a21 and the plurality of concave portions 810a22 may be respectively disposed to engage with the plurality of concave portions 110a12 and the plurality of convex portions 110a11 of the first upper cover 110a1.

Meanwhile, the display device 800 according to one or more embodiments of the present disclosure is wound in an outward manner in which the display surface of the display panel 120 is directed away from the roller 161. That is, an upper cover 810a may be disposed to be closer to the roller 161 than the display panel 120 is to the roller 161, which is the opposite arrangement in comparison with the embodiments above in which the display panel 120 is wound facing the roller 161.

With reference back to FIG. 8, the plurality of convex portions 810a21 of the second upper cover 810a2 is disposed closer to the convex portions 110a11 of the first upper cover 110a1, which are disposed at the lower side among the plurality of concave portions 110a12 of the first upper cover 110a1, than the convex portions 110a11 of the first upper cover 110a1 that are disposed at the upper side among the plurality of concave portions 110a12 of the first upper cover 110a1. As described above, in case that the display device 800 is wound in an outward manner, the first upper cover 110a1 is wound with a larger radius of curvature than the second upper cover 810a2 wound to be adjacent to the roller 161. Therefore, during the winding process, the upper end of the first upper cover 110a1 may be further moved downward than the upper end of the second upper cover 810a2, and the plurality of convex portions 110a11 of the first upper cover 110a1 may be further moved downward than the plurality of concave portions 810a22 of the second upper cover 810a2. Therefore, the spacing distances (d1, d2, . . . , dn−1, and dn) may be ensured between the convex portion 810a21 of the second upper cover 810a2 and the convex portion 110a11 of the first upper cover 110a1, thereby accommodating a slip of the convex portion 110a11 of the first upper cover 110a1.

With reference to FIG. 8, the spacing distances (d1, d2, . . . , dn−1, and dn) between the convex portion 810a21 of the second upper cover 810a2 and the convex portion 110a11 of the first upper cover 110a1 may increase as the distance from the roller 161 increases. That is, a difference in width between the plurality of concave portions 110a12 of the first upper cover 110a1 and the plurality of convex portions 810a21 of the second upper cover 810a2, which correspond to one another, and a difference in width between the plurality of concave portions 810a22 of the second upper cover 810a2 and the plurality of convex portions 110a11 and the first upper cover 110a1, which correspond to one another may increase in a direction from a lower side of the upper cover 810a adjacent to the roller 161 to an upper side of the upper cover 810a. Therefore, it is possible to accommodate a slip of the first upper cover 110a1 that increases at the upper side of the upper cover 810a as a radius between the roller 161 and the display panel 120 increases.

Meanwhile, the first fastening hole AH1 of the second upper cover 810a2 may have a shape having a width in the upward/downward direction larger than a width in the leftward/rightward direction. In this case, when the display panel 120 is fully unwound, the plurality of fastening members SC is disposed adjacent to upper sides of the first fastening holes AH1 of the second upper cover 810a2. Therefore, it is possible to accommodate the movement of the fastening member SC when the first fastening hole AH1 of the second upper cover 810a2 moves upward during the process of winding the display panel 120 in an outward manner.

Meanwhile, the second upper cover 810a2 includes the plurality of second opening portions 111b each equal in shape to the first opening portion 111a of the first upper cover 110a1. The arrangement position of the second opening portion 111a of the second upper cover 810a2 may be designed independently regardless of the arrangement of the plurality of concave portions 810a22 and the plurality of convex portions 810a21 of the second upper cover 810a2.

In the display device 800 according to one or more embodiments of the present disclosure, the upper cover 810a includes the first and second upper covers 110a1 and 810a2 having a small thickness. The first upper cover 110a1 and the second upper cover 810a2 are configured to engage with each other. Therefore, the upper cover 810a may have high rigidity with respect to the thickness, thereby improving the bending of the display device 800 that may be caused by the expansion of the polarizing plate, in comparison with the case in which the upper cover is configured as a single cover.

In addition, in the display device 800 according to one or more embodiments of the present disclosure, the first opening portion 111a of the first upper cover 110a1 and the second opening portion 111b of the second upper cover 810a2 are formed by the independent processes. Therefore, it is possible to minimize the area of the first opening portion 111a, the area of the second opening portion 111b, and the area of the opening portion 111. Therefore, it is possible to maintain rigidity of the display device 800 and solve the problem in which the opening portion 111 is visually recognized by the user.

In addition, the display device 800 according to one or more embodiments of the present disclosure is disposed so that a difference in width between the plurality of concave portions 110a12 of the first upper cover 110a1 and the plurality of convex portions 110a21 of the second upper cover 810a2, which correspond to one another, and a difference in width between the plurality of concave portions 810a22 of the second upper cover 810a2 and the plurality of convex portions 110a11 and the first upper cover 110a1, which correspond to one another may increase in a direction from a lower side of the upper cover 810a adjacent to the roller 161 to an upper side of the upper cover 810a. Therefore, in case that the display device 800 is wound in an outward manner, it is possible to accommodate the movements of the plurality of convex portions 110a11 of the first upper cover 110a1 that increases at the upper side of the upper cover 810a. Therefore, it is possible to reduce a problem in which the display panel 120 is lifted up or the display panel 120 is creased. In sum, FIG. 8 is provided as a non-limiting example of techniques to account for the slip phenomenon, among other benefits discussed herein, for an outward-type roller 161, whereas FIGS. 1-7 are designed for an inward-type roller 161. The direction of rotation of the roller 161 changes which layer of the upper cover 110a, 810a is closest to the roller 161 and thus, where slip is likely to occur. In FIGS. 1-7, the gaps d1 . . . dn are provided between a top surface of the convex portions 110a11 of the first upper cover 110a1 and a bottom surface of the convex portions 110a21 of the second upper cover 110a2, while in FIG. 8, the gaps d1 . . . dn are provided between a top surface of the convex portions 810a21 of the second upper cover 810a2 and a bottom surface of the convex portions 110a11 of the first upper cover 110a1.

Figure 9:
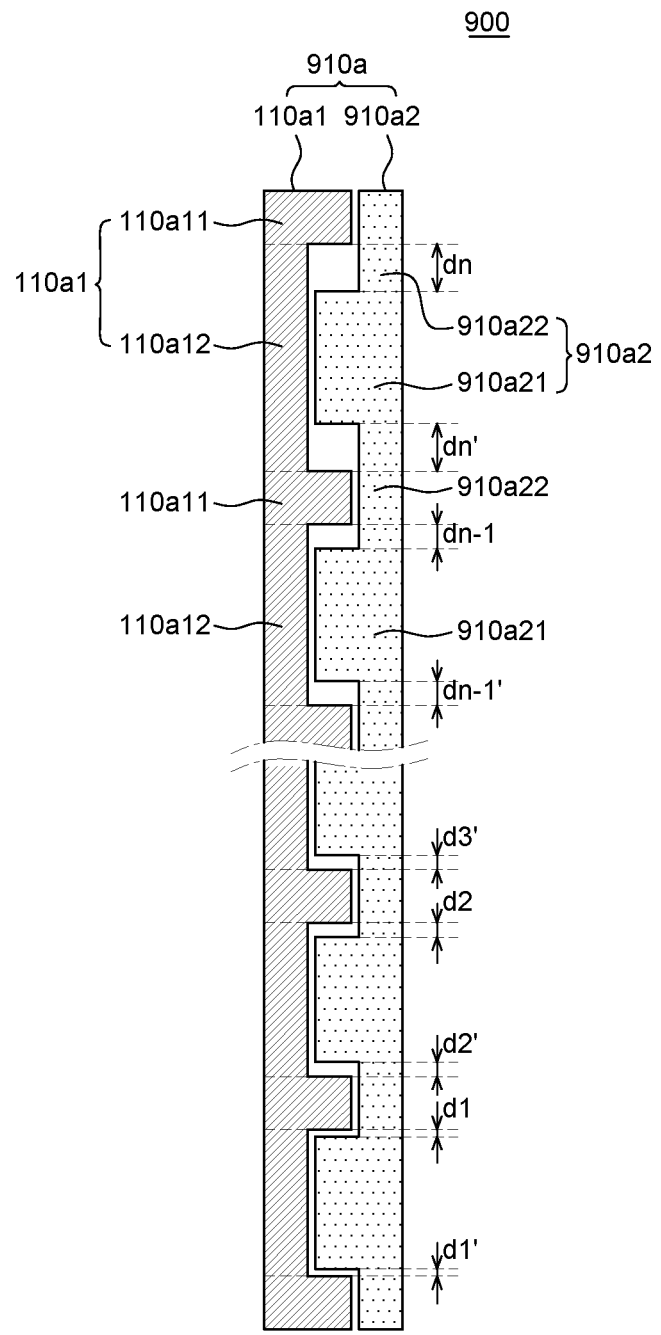
FIG. 9 is a schematic cross-sectional view of an upper cover of a display device according to an embodiment of the present disclosure.

FIG. 9 is a schematic cross-sectional view of an upper cover 910a of a display device 900 according to one or more embodiments of the present disclosure. The upper cover 910a of the display device 900 in FIG. 9 is substantially identical in configuration to the upper cover 110a of the display device 100 in FIGS. 1 to 7, except for only a plurality of convex portions 910a21 and a plurality of concave portions 910a22 of a second upper cover 910a2. Therefore, repeated descriptions of the identical components will be omitted. For convenience of illustration, FIG. 9 illustrates only the upper cover 910a among various constituent elements of the display device 900.

With reference to FIG. 9, the second upper cover 910a2 includes the plurality of convex portions 910a21 and the plurality of concave portions 910a22. The plurality of convex portions 910a21 and the plurality of concave portions 910a22 of the second upper cover 910a2 are respectively disposed to engage with the plurality of concave portions 110a12 and the plurality of convex portions 110a11 of the first upper cover 110a1.

Meanwhile, the display device 900 according to one or more embodiments of the present disclosure may be wound in an outward manner in which the display surface of the display panel 120 is directed toward the roller 161. Further, the display device 900 may be wound in an inward manner. Therefore, in case that the display panel 120 is wound around the roller 161, the upper cover 910a may be disposed to be closer to the roller 161 than the display panel 120 to the roller 161, or the display panel 120 may be disposed to be closer to the roller 161.

With reference to FIG. 9, spacing distances (d1', d2', . . . , dn−1', dn') between the plurality of convex portions 910a21 of the second upper cover 910a2 and the convex portion 110a11 of the first upper cover 110a1 at the lower side of the plurality of concave portions 110a12 of the first upper cover 110a1 are equal to the spacing distances (d1, d2, . . . , dn−1, and dn) between the plurality of convex portions 910a21 of the second upper cover 910a2 and the convex portion 110a11 of the first upper cover 110a1 at the upper side of the plurality of concave portions 110a12 of the first upper cover 110a1.

Therefore, in case that the display device 900 is wound in an outward manner, the first upper cover 110a1 is wound with a larger radius of curvature than the second upper cover 910a2 wound to be adjacent to the roller 161. Therefore, the plurality of convex portions 110a11 of the first upper cover 110a1 may be further moved downward than the plurality of concave portions 910a22 of the second upper cover 910a2. In addition, in case that the display device 900 is wound in an inward manner, the second upper cover 910a2 is wound with a larger radius of curvature than the first upper cover 110a1 wound to be adjacent to the roller 161. Therefore, the plurality of convex portions 910a21 of the second upper cover 910a2 may be further moved downward than the plurality of concave portions 110a12 of the first upper cover 110a1. Therefore, the spacing distances (d1', d2', . . . , dn−1', dn') between the convex portion 910a21 of the second upper cover 910a2 and the convex portion 110a11 of the first upper cover 110a1 are disposed and ensured not only at the upper side of the convex portion 910a21 of the second upper cover 910a2 by way of at the lower side of the convex portion 910a21 of the second upper cover 910a2. Therefore, it is possible to accommodate a slip of the convex portion 110a11 of the first upper cover 110a1 or a slip of the convex portion 910a21 of the second upper cover 910a2.

With reference to FIG. 9, the spacing distances (d1, d1', d2, d2', . . . , dn−1, dn−1'dn, dn') between the convex portion 910a21 of the second upper cover 910a2 and the convex portion 110a11 of the first upper cover 110a1 may increase as the distance from the roller 161 increases. Therefore, it is possible to accommodate a slip of the first upper cover 110a1 or a slip of the second upper cover 910a2 that increases as a radius between the roller 161 and the display panel 120 increases.

In the display device 900 according to one or more embodiments of the present disclosure, the upper cover 910a includes the first and second upper covers 110a1 and 910a2 having a small thickness. The first upper cover 110a1 and the second upper cover 910a2 are configured to engage with each other. Therefore, the upper cover may have high rigidity with respect to the thickness, thereby improving the bending of the display device 900 that may be caused by the expansion of the polarizing plate, in comparison with the case in which the upper cover is configured as a single cover.

In addition, in the display device 900 according to one or more embodiments of the present disclosure, the first opening portion 111a of the first upper cover 110a1 and the second opening portion 111b of the second upper cover 910a2 are formed by the independent processes. Therefore, it is possible to minimize the area of the first opening portion 111a, the area of the second opening portion 111b, and the area of the opening portion 111. Therefore, it is possible to maintain rigidity of the display device 900 and solve the problem in which the opening portion 111 is visually recognized by the user.

In addition, the display device 900 according to one or more embodiments of the present disclosure is disposed so that a difference in width between the plurality of concave portions 110a12 of the first upper cover 110a1 and the plurality of convex portions 910a21 of the second upper cover 910a2, which correspond to one another, and a difference in width between the plurality of concave portions 910a22 of the second upper cover 910a2 and the plurality of convex portions 110a11 and the first upper cover 110a1, which correspond to one another may increase in a direction from a lower side of the upper cover 910a adjacent to the roller 161 to an upper side of the upper cover 910a. In addition, the spacing distances (d1', d2', . . . , dn−1', dn') between the plurality of convex portions 910a21 of the second upper cover 910a2 and the convex portion 110a11 of the first upper cover 110a1 at the lower side of the plurality of concave portions 110a12 of the first upper cover 110a1 are equal to the spacing distances (d1, d2, . . . , dn−1, and dn) between the plurality of convex portions 910a21 of the second upper cover 910a2 and the convex portion 110a11 of the first upper cover 110a1 at the upper side of the plurality of concave portions 110a12 of the first upper cover 110a1. Therefore, in case that the display device 900 is wound in an inward manner, it is possible to accommodate the movements of the plurality of convex portions 910a21 of the second upper cover 910a2 that increases at the upper side of the upper cover 910a. In case that the display device 900 is wound in an outward manner, it is possible to accommodate the movements of the plurality of convex portions 110a11 of the first upper cover 110a1 and reduce a problem in which the display panel 120 is lifted up or the display panel 120 is creased.

In sum, the upper cover 910a is similar to the upper covers 110a, 810a, described herein, except that the convex portions 910a21 of the second upper cover 910a2 are centered with respect to the concave portions 110a12 of the first upper cover 110a1 and may be spaced equidistant (or in some other arrangement) from the convex portions 110a11 of the first upper cover 110a1. Thus, the upper cover 910a may be particularly beneficial for use with an inward type roller 161 or an outward type roller 161 (i.e., winding or unwinding in either a clockwise or counterclockwise direction, or both) in order to account for, and reduce, slip regardless of the direction of rotation of the roller during winding.

Figure 10A:
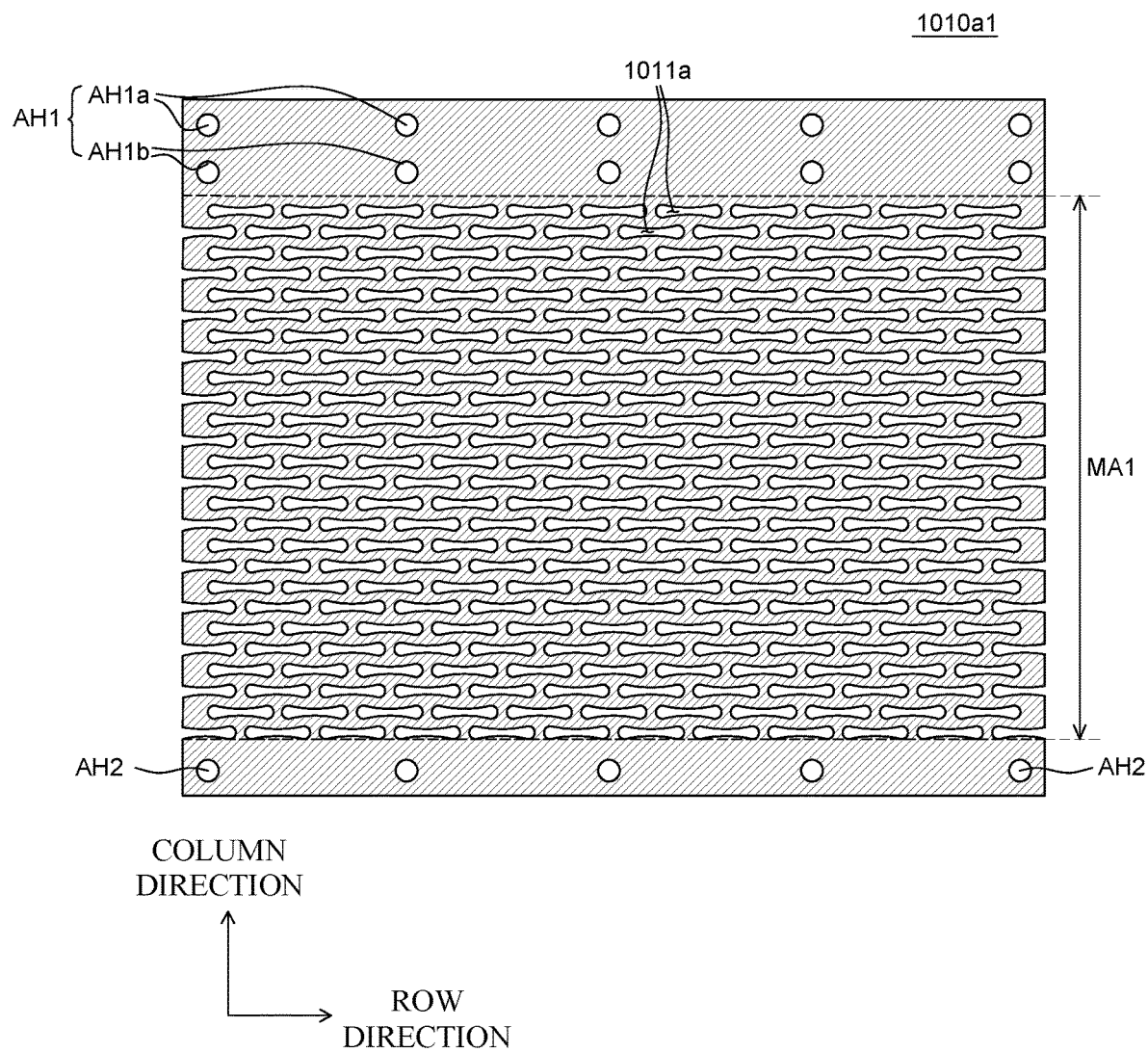
FIG. 10A is an elevational view of a first upper cover of a display device according to an embodiment of the present disclosure.
Figure 10B:
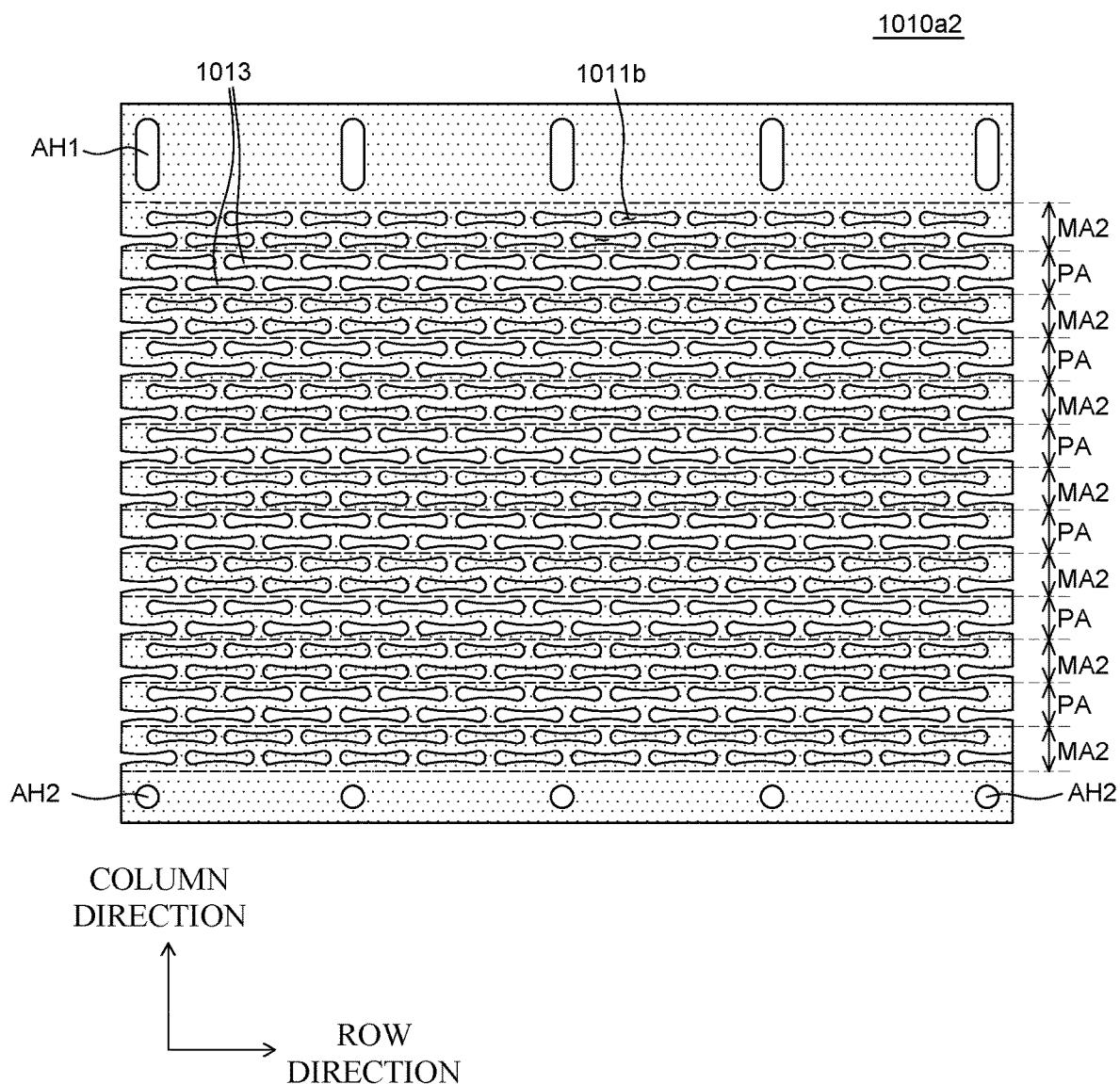
FIG. 10B is a an elevational view of a second upper cover of the display device of FIG. 10A.
Figure 10C:
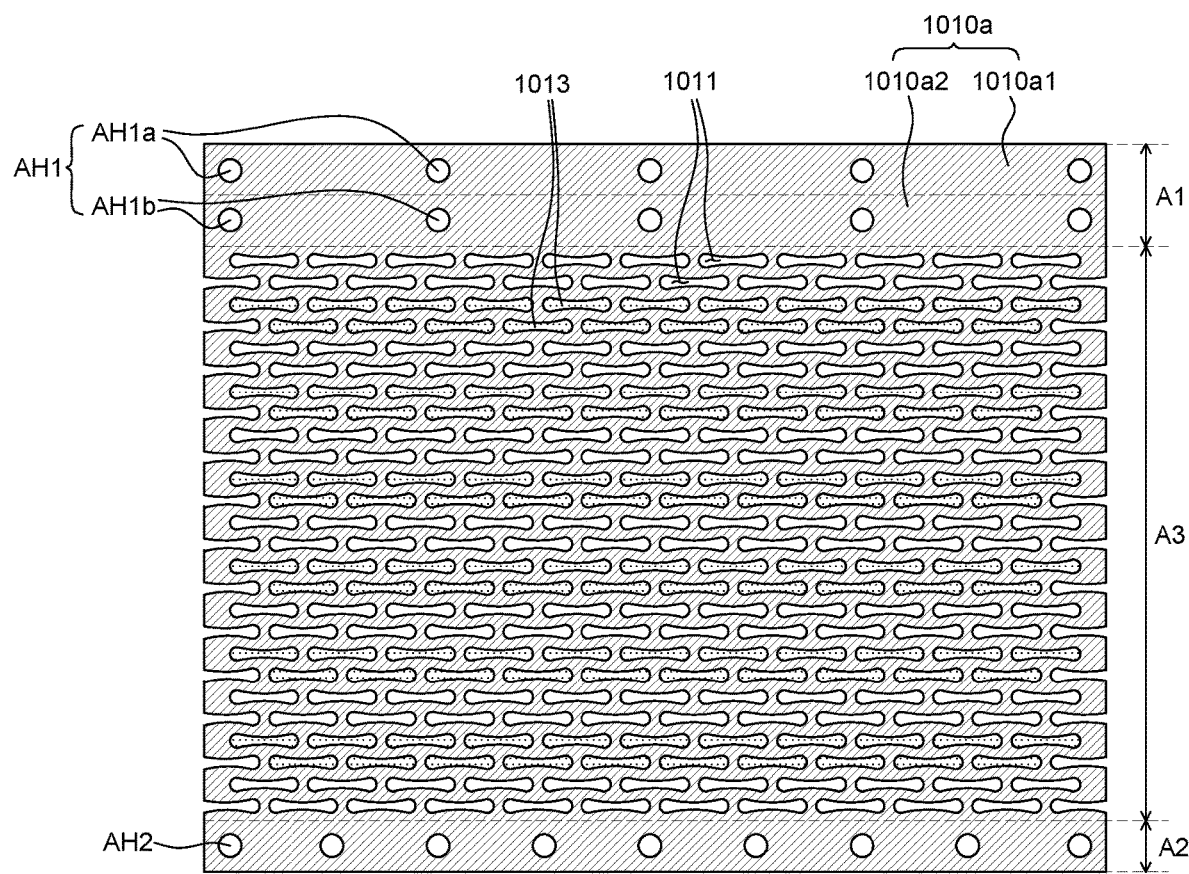
FIG. 10C is a schematic elevational view of an upper cover of the display device of FIG. 10A.
Figure 10D:
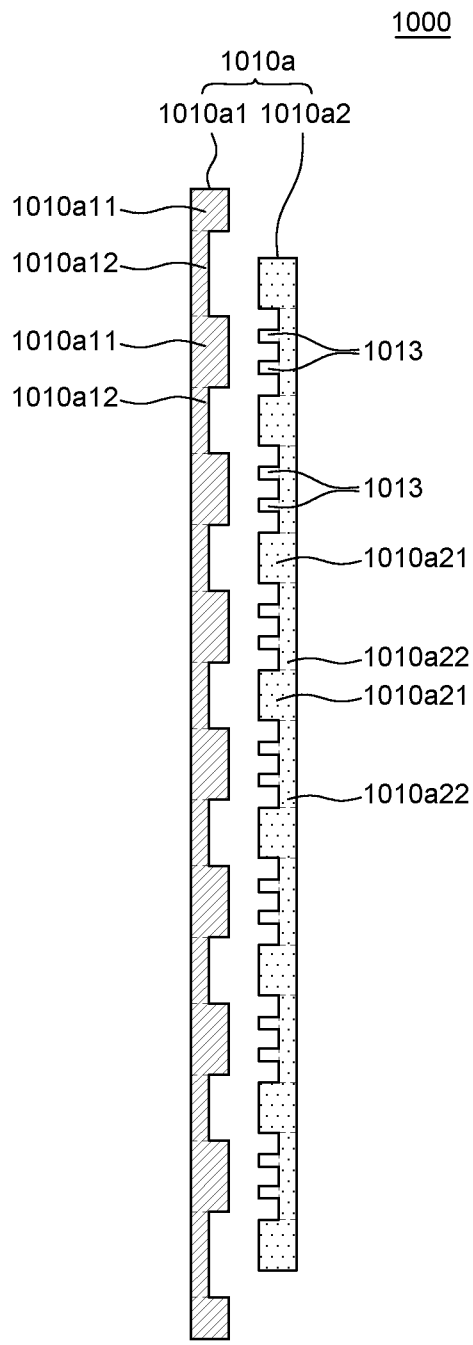
FIG. 10D is a schematic cross-sectional view of the upper cover of the display device of FIG. 10C.

FIG. 10A is an elevational view of a first upper cover 1010a1 of a display device 1000 according to one or more embodiments of the present disclosure. FIG. 10B is an elevational view of a second upper cover 1010a2 of the display device 1000. FIG. 10C is a schematic elevational view of an upper cover 1010a of the display device 1000. FIG. 10D is a schematic cross-sectional view of the upper cover 1010a of the display device 1000. The upper cover 1010a of the display device 1000 according to one or more embodiments of the present disclosure is substantially identical in configuration to the upper cover 110a of the display device 100 in FIGS. 1 to 7, except for a third area A3 of a first upper cover 1010a1 and a third area A3 of a second upper cover 1010a2. Therefore, repeated descriptions of the identical components will be omitted. For convenience of illustration, FIGS. 10A to 10D illustrate only the upper cover 1010a among various constituent elements of the display device 1000.

With reference to FIG. 10A, the first upper cover 1010a1 includes the first area A1, the second area A2, and the third area A3.

The third area A3 of the first upper cover 1010a1 includes the first flexible area MA1. The first flexible area MA1 of the first upper cover 1010a1 includes a plurality of first opening portions 1011a.

With reference to FIG. 10B, the second upper cover 1010a2 includes the first area A1, the second area A2, and the third area A3.

In the third area A3, the second upper cover 1010a2 includes a plurality of second flexible areas MA2, and a plurality of support areas PA disposed between the plurality of second flexible areas MA2.

The second flexible area MA2 of the second upper cover 1010a2 includes a plurality of second opening portions 1011b. The second flexible area MA2 of the second upper cover 1010a2 is disposed to correspond to another partial area of the first flexible area MA1 of the first upper cover 1010a1, which does not overlap the plurality of support areas PA of the second upper cover 1010a2, among the portions of the first upper cover 1010a1. In this case, the first opening portion 1011a and the second opening portion 1011b may completely overlap each other. In the second flexible area MA2 of the second upper cover 1010a2, an object disposed rearward of the second upper cover 1010a2 may be visually recognized from the front surface of the first upper cover 1010a1 through the first opening portion 1011a and the second opening portion 1011b.

The plurality of support areas PA of the second upper cover 1010a2 is disposed to correspond to some of the plurality of first flexible areas MA1 of the first upper cover 1010a1.

With reference to FIGS. 10C and 10D, a plurality of protruding patterns 1013 may be disposed in the plurality of support areas PA of the second upper cover 1010a2. The plurality of protruding patterns 1013 protrudes in the direction in which the first upper cover 1010a1 is disposed. The plurality of protruding patterns 1013 may be identical in shape to the first opening portion 1011a of the first upper cover 1010a1. Meanwhile, a size of each of the plurality of protruding patterns 1013 may be smaller than a size of the plurality of first opening portions 1011a in the first upper cover 1010a1.

With reference to FIGS. 10C and 10D, the plurality of protruding patterns 1013 is disposed at positions corresponding to the plurality of first opening portions 1011a of the first upper cover 1010a1. Therefore, the plurality of protruding patterns 1013 of the second upper cover 1010a2 may be inserted into, and received in, the plurality of first opening portions 1011a of the first upper cover 1010a1. Therefore, as illustrated in FIG. 10C, in the first flexible area MA1 of the first upper cover 1010a1, top surfaces of the plurality of protruding patterns 1013 of the second upper cover 1010a2 may be visually recognized through the plurality of first opening portions 1011a.

Meanwhile, the first upper cover 1010a1 and the second upper cover 1010a2 may respectively include a plurality of concave portions 1010a12 and 1010a22 and a plurality of convex portions 1010a11 and 1010a21. The plurality of concave portions 1010a12 and the plurality of convex portions 1010a11 of the first upper cover 1010a1 may be disposed to engage with the plurality of concave portions 1010a22 and the plurality of convex portions 1010a21 of the second upper cover 1010a2.

In the display device 1000 according to one or more embodiments of the present disclosure, the upper cover 1010a includes the first and second upper covers 1010a1 and 1010a2 having a small thickness. The first upper cover 1010a1 and the second upper cover 1010a2 are configured to engage with each other. Therefore, the upper cover may have high rigidity with respect to the thickness, thereby improving the bending of the display device 1000 that may be caused by the expansion of the polarizing plate, in comparison with the case in which the upper cover is configured as a single cover.

In addition, in the display device 1000 according to one or more embodiments of the present disclosure, the first opening portion 1011a of the first upper cover 1010a1 and the second opening portion 1011b of the second upper cover 1010a2 are formed by the independent processes. Therefore, it is possible to minimize the area of the first opening portion 1011a and the area of the second opening portion 1011b. Therefore, it is possible to maintain rigidity of the display device 1000 and solve the problem in which the first opening portion 1011a and the second opening portion 1011b are visually recognized by the user.

In addition, in the display device 1000 according to one or more embodiments of the present disclosure, the plurality of protruding patterns 1013 is disposed in the support area PA of the second upper cover 1010a2. Therefore, the plurality of protruding patterns 1013 of the second upper cover 1010a2 is inserted into the plurality of first opening portions 1011a of the first upper cover 1010a1, such that a coupling force between the first upper cover 1010a1 and the second upper cover 1010a2 is reinforced or increased, thereby improving overall rigidity of the upper cover 1010a. In other words, the plurality of protruding patterns 1013 are received in and at least partially or substantially completely fill the plurality of first opening portions 1011a of the first upper cover 1010a1 to increase rigidity, while still allowing deformation of the first opening portions 1011a to reduce stress. In addition, the plurality of protruding patterns 1013 protrudes in a direction in which the plurality of first opening portions 1011a is disposed, such that the plurality of protruding patterns 1013 is disposed while filling the plurality of first opening portions 1011a. In this case, a size of each of the plurality of protruding patterns 1013 may be smaller than a size of the plurality of first opening portions 1011a. Therefore, it is possible to inhibit the plurality of first opening portions 1011a from being visually recognized in the front surface of the upper cover 1010a and the display panel 120 and improve the flatness of the upper cover 1010a.

Figure 11A:
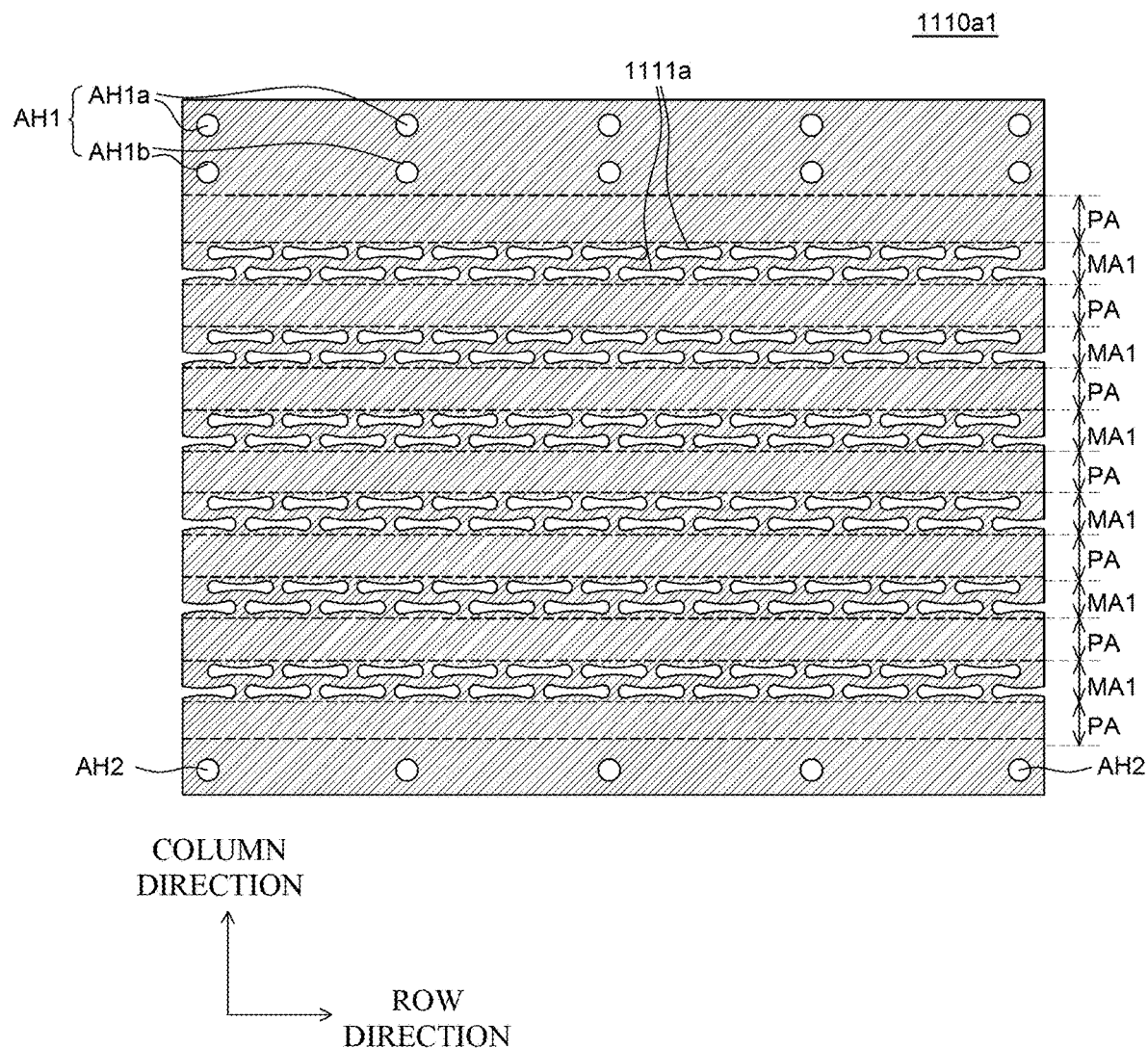
FIG. 11A is an elevational view of a first upper cover of a display device according to an embodiment of the present disclosure.
Figure 11B:
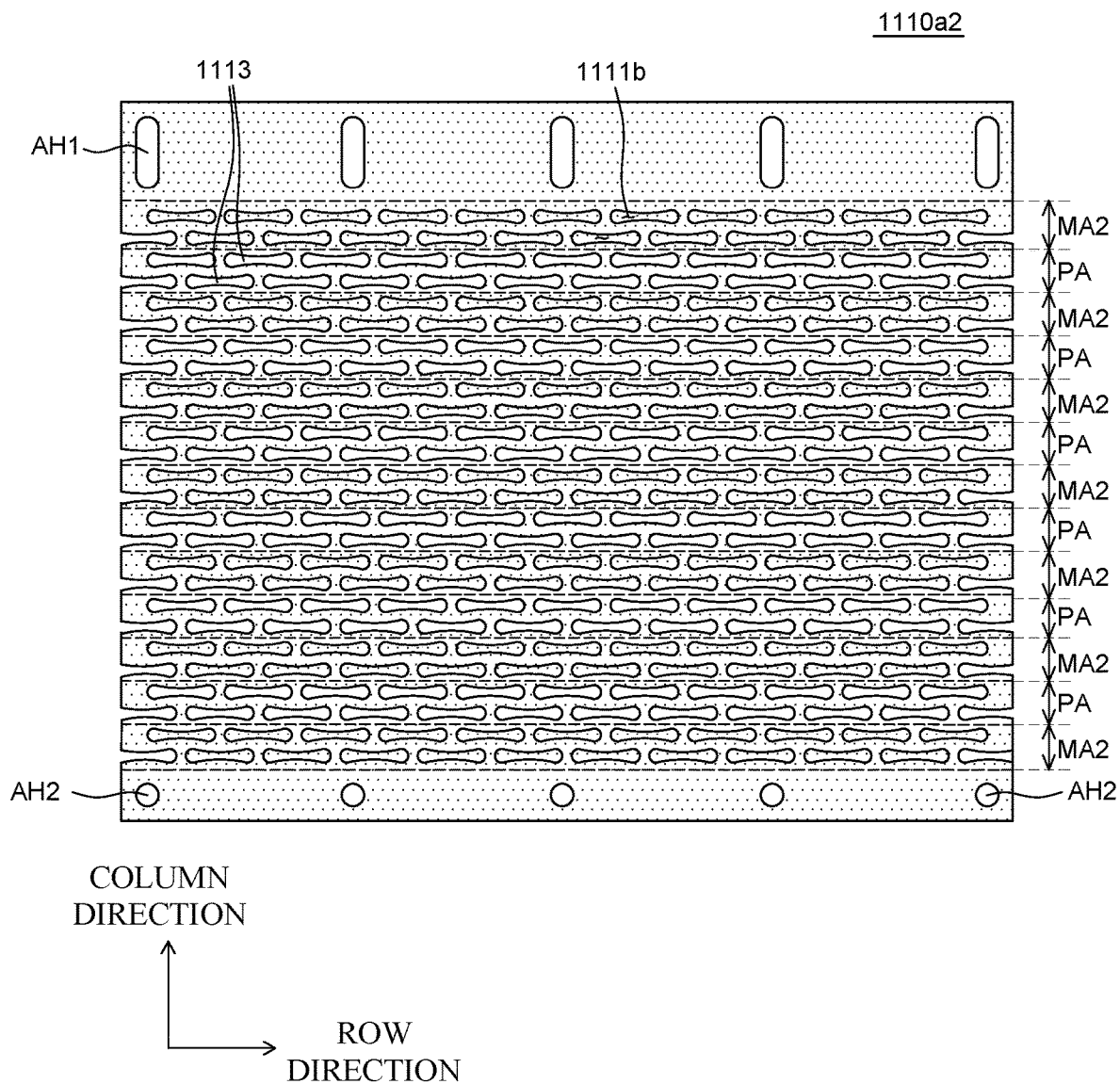
FIG. 11B is an elevational view of a second upper cover of the display device of FIG. 11A.
Figure 11C:
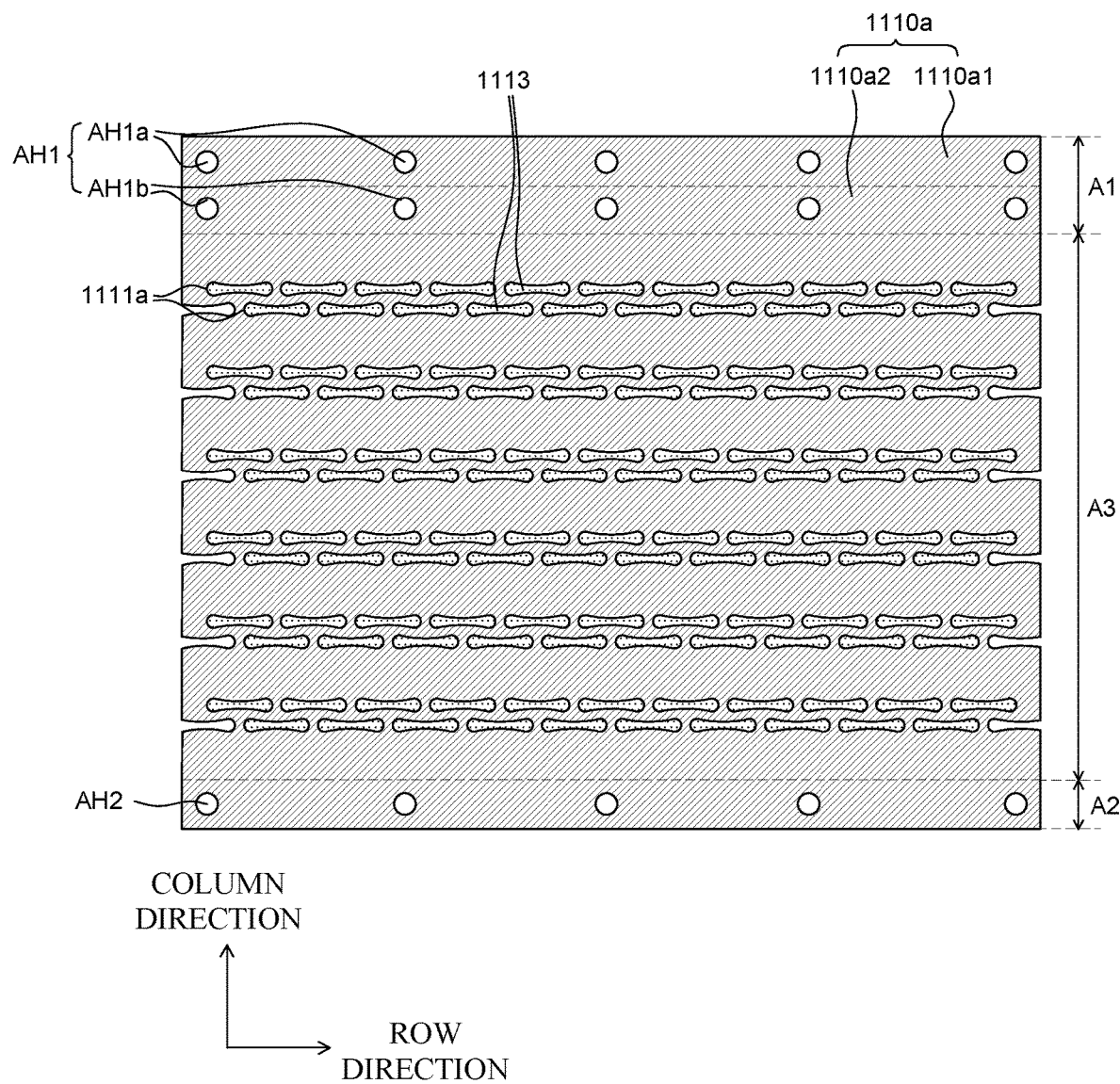
FIG. 11C is a schematic elevational view of an upper cover of the display device of FIG. 11A.
Figure 11D:
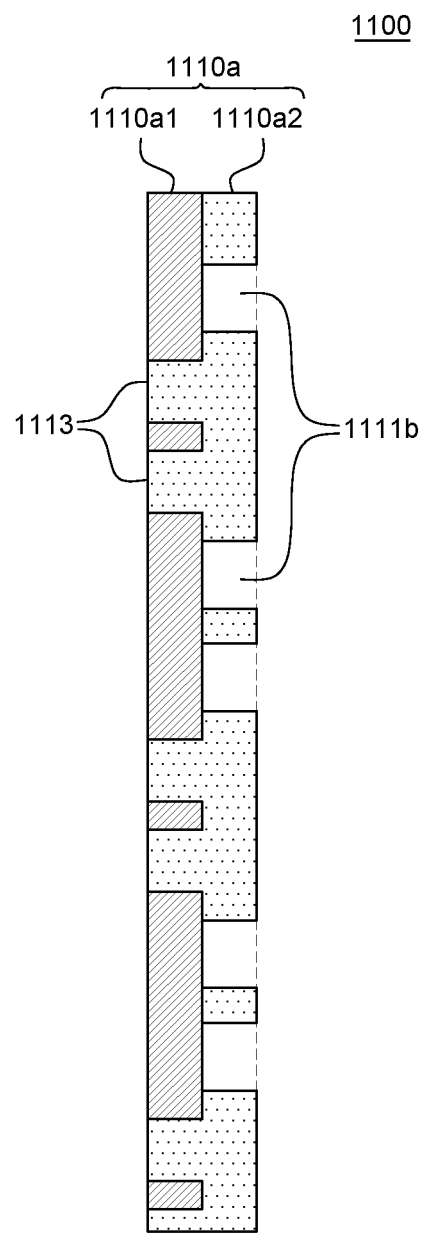
FIG. 11D is a schematic cross-sectional view of the upper cover of the display device of FIG. 11C.

FIG. 11A is an elevational view of a first upper cover 1110a1 of a display device 1100 according to one or more embodiments of the present disclosure. FIG. 11B is an elevational view of a second upper cover 1110a2 of the display device 1100 according to one or more embodiments. FIG. 11C is a schematic elevational view of an upper cover 1110a of the display device 1000. FIG. 11D is a schematic cross-sectional view of the upper cover 1110a of the display device 1100. The upper cover 1110a of the display device 1100 according to one or more embodiments of the present disclosure is substantially identical in configuration to the upper cover 110a of the display device 100 in FIGS. 1 to 7, except for a third area A3 of a first upper cover 1110a1 and a third area A3 of a second upper cover 1110a2. Therefore, repeated descriptions of the identical components will be omitted. For convenience of illustration, FIGS. 11A to 11D illustrate only the upper cover 1110a among various constituent elements of the display device 1100.

The first upper cover 1110a1 includes the plurality of first flexible areas MA1 disposed in the third area A3, and the plurality of support areas PA disposed between the plurality of first flexible areas MA1.

The first flexible area MA1 of the first upper cover 1110a1 includes a plurality of first opening portions 1111a.

The plurality of support areas PA of the first upper cover 1110a1 may be disposed between the plurality of second flexible areas MA2. The plurality of opening portions 1111a, which is disposed in the plurality of first flexible areas MA1, is not disposed in the plurality of support areas PA. Thus, the first upper cover 1110a1 may optionally include flexible areas MA1 separated by support areas PA with the flexible areas MA1 including openings 1111a, similar to the second upper cover 110a2 described above. In some embodiments, any of the features of the first cover 110a1 can be incorporated into the second cover 110a2, and vice versa, depending on design factors.

The second upper cover 1110a2 includes the plurality of second flexible areas MA2 disposed in the third area A3, and the plurality of support areas PA disposed between the plurality of second flexible areas MA2.

The second flexible area MA2 of the second upper cover 1110a2 is disposed to correspond to the plurality of support areas PA of the first upper cover 1110a1.

A plurality of second opening portions 1111b is disposed in the plurality of second flexible areas MA2 of the second upper cover 1110a2. The plurality of second opening portions 1111b may be identical in shape to the first opening portion 1111a of the first upper cover 1110a1. However, the present disclosure is not limited thereto.

The plurality of support areas PA of the second upper cover 1110a2 is disposed to correspond to the plurality of first flexible areas MA1 of the first upper cover 1110a1.

The plurality of second opening portions 1111b, which is disposed in the second flexible area MA2, is not disposed in the support area PA of the second upper cover 1110a2. Therefore, the second upper cover 1110a2 may support the first upper cover 1110a1 disposed on the front surface of the second upper cover 1110a2 in the support area PA.

Meanwhile, with reference to FIGS. 11B to 11D, a plurality of protruding patterns 1113 is disposed in the plurality of support areas PA of the second upper cover 1110a2. The protruding pattern 1113 of the second upper cover 1110a2 may be disposed to protrude by a thickness of the first upper cover 1110a1.

The protruding pattern 1113 of the second upper cover 1110a2 may be identical in shape to the first opening portion 1111a. In addition, the protruding pattern 1113 of the second upper cover 1110a2 may be identical in size to the first opening portion 1111a of the first upper cover 1110a1.

Therefore, with reference to FIG. 11D, the plurality of protruding patterns 1113 may be inserted into the plurality of first opening portions 1111a of the first upper cover 1110a1. Therefore, as illustrated in FIG. 11C, in the area that overlaps the plurality of support areas PA of the second upper cover 1110a2, the protruding pattern 1113 of the second upper cover 1110a2 may be exposed through the first opening portion 1111a of the first upper cover 1110a1. In this case, the plurality of protruding patterns 1113 may fill the plurality of first opening portions 1111a of the first upper cover 1110a1 without a separation space.

Meanwhile, with reference to FIGS. 11C and 11D, the second opening portion 1111*b* of the second upper cover 1110*a*2 may be supported by the plurality of support areas PA of the first upper cover 1110*a*1. Therefore, the second opening portion 1111*b* may not be visually recognized from the front surface of the upper cover 1110*a*.

In the display device 1100 according to one or more embodiments of the present disclosure, the upper cover 1110*a* includes the first and second upper covers 1110*a*1 and 1110*a*2 having a small thickness. The first upper cover 1110*a*1 and the second upper cover 1110*a*2 are configured to engage with each other. Therefore, the upper cover may have high rigidity with respect to the thickness, thereby improving the bending of the display device 1100 that may be caused by the expansion of the polarizing plate, in comparison with the case in which the upper cover is configured as a single cover.

In addition, in the display device 1100 according to one or more embodiments of the present disclosure, the first opening portion 1111*a* of the first upper cover 1110*a*1 and the second opening portion 1111*b* of the second upper cover 1110*a*2 are formed by the independent processes. Therefore, it is possible to minimize the area of the first opening portion 1111*a* and the area of the second opening portion 1111*b*. Therefore, it is possible to maintain rigidity of the display device 1100 and solve the problem in which the first opening portion 1111*a* and the second opening portion 1111*b* are visually recognized by the user.

In addition, in the display device 1110 according to one or more embodiments of the present disclosure, the protruding pattern 1113 is disposed in the support area PA of the second upper cover 1110*a*2. Therefore, the protruding pattern 1113 of the second upper cover 1110*a*2 is inserted into the first opening portion 1111*a* of the first upper cover 1110*a*1, such that a coupling force between the first upper cover 1110*a*1 and the second upper cover 1110*a*2 is reinforced, thereby improving overall rigidity of the upper cover 1110*a*.

In addition, in the display device 1110 according to one or more embodiments of the present disclosure, the plurality of protruding patterns 1113 of the second upper cover 1110*a*2 may be identical in size to the plurality of first opening portions 1111*a*. Therefore, the plurality of protruding patterns 1113 fills the plurality of first opening portions 1111*a*, such that the front surface of the upper cover 1110*a* may be recognized as a flat shape without an opening area. Therefore, it is possible to improve the flatness of the upper cover 1110*a* and inhibit the plurality of first opening portions 1111*a* from being visually recognized in the front surface of the upper cover 1110*a* and the display panel 120. Meanwhile, a top surface of the protruding pattern 1113 may adjoin the display panel 120 through the first opening portion 1111*a*. Therefore, the front surface of the upper cover 1110*a* may adjoin the display panel 120. Therefore, a bonding area between the display panel 120 and the upper cover 1110*a* increases, which increases overall bond strength between the display panel 120 and the upper cover 1110*a* and may suppress the separation of the display panel 120 and the upper cover 1110*a*.

Figure 12:
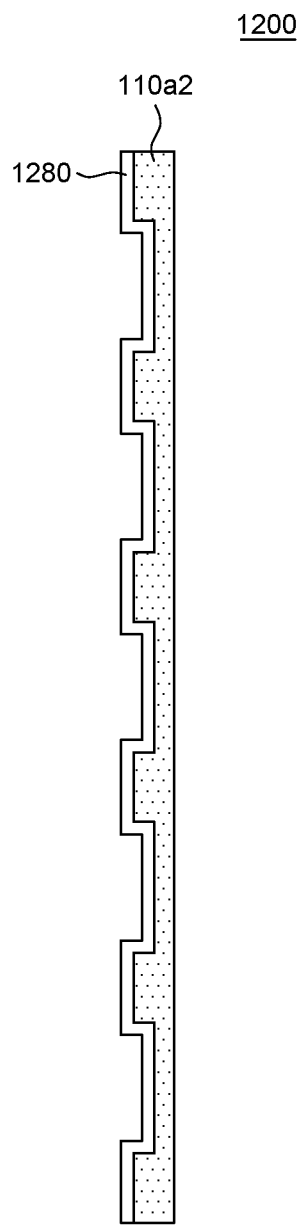
FIG. 12 is a schematic cross-sectional view of a second upper cover of a display device according to an embodiment of the present disclosure.

FIG. 12 is a schematic cross-sectional view of a second upper cover of a display device 1200 according to one or more embodiments of the present disclosure. An upper cover of a display device 1200 according to of the present disclosure is substantially identical in configuration to the upper cover 110*a* of the display device 100 in FIGS. 1 to 7, except that a friction reduction layer 1280 is added to the second upper cover 110*a*2. Therefore, repeated descriptions of the identical components will be omitted. For convenience of illustration, FIG. 12 illustrates only the second upper cover 110*a*2 and the friction reduction layer 1280 among various constituent elements of the display device 1200.

The friction reduction layer 1280 may be disposed on at least one of a surface of the first upper cover 110*a*1 and a surface of the second upper cover 110*a*2 that face each other. For example, as illustrated in FIG. 12, the friction reduction layer 1280 may be disposed on one surface of the second upper cover 110*a*2 that faces the first upper cover 110*a*1, or the friction reduction layer 1280 may be disposed on one surface of the first upper cover 110*a*1 that faces the second upper cover 110*a*2, or both.

The friction reduction layer 1280 may be made of a material having a low frictional coefficient. For example, the friction reduction layer 1280 may be made of a material such as Teflon. However, the present disclosure is not limited thereto. Therefore, the friction reduction layer 1280 may be disposed between the first upper cover 110*a*1 and the second upper cover 110*a*2 and reduce a frictional force in a horizontal direction between the first and second upper covers 110*a*1, 110*a*2.

Meanwhile, although not illustrated in FIG. 12, the display device may further include a magnet disposed on at least one of the surface of the first upper cover 110*a*1 and the surface of the second upper cover 110*a*2 that face each other, or the magnet may be disposed on the friction reduction layer 1280 along the shape of the friction reduction layer 1280. The magnet may attach the first upper cover 110*a*1 and the second upper cover 110*a*2 and increase a coupling force between the first upper cover 110*a*1 and the second upper cover 110*a*2 to further improve the connection between the first and second upper covers 110*a*1, 110*a*2 and reduce separation of the first and second upper covers 110*a*1, 110*a*2.

In the display device 1200 according to one or more embodiments of the present disclosure, the upper cover 110*a* includes the first and second upper covers 110*a*1 and 110*a*2 having a small thickness. The first upper cover 110*a*1 and the second upper cover 110*a*2 are configured to engage with each other. Therefore, the upper cover may have high rigidity with respect to the thickness, thereby improving the bending of the display device 1200 that may be caused by the expansion of the polarizing plate, in comparison with the case in which the upper cover is configured as a single cover.

In addition, in the display device 1200 according to one or more embodiments of the present disclosure, the first opening portion 111*a* of the first upper cover 110*a*1 and the second opening portion 111*b* of the second upper cover 110*a*2 are formed by the independent processes. Therefore, it is possible to minimize the area of the opening portion 111. Therefore, it is possible to maintain rigidity of the display device 1200 and solve the problem in which the opening portion 111 is visually recognized by the user.

In addition, in the display device 1200 according to one or more embodiments of the present disclosure, the friction reduction layer 1280 and/or the magnet are disposed between the first upper cover 110*a*1 and the second upper cover 110*a*2. In case that the first upper cover 110*a*1 and the second upper cover 110*a*2 directly adjoin each other, friction may be generated between the first upper cover 110*a*1 and the second upper cover 110*a*2 during the winding process. For this reason, the display panel 120 may not be smoothly wound. Therefore, in the display device 1200 according to one or more embodiments of the present disclosure, the friction reduction layer 1280 and/or the magnet are disposed between the first upper cover 110*a*1 and the second upper cover 110*a*2. Therefore, the coupling force may be maintained so that the first upper cover 110a1 and the second upper cover 110a2 are not separated. Further, the first upper cover 110a1 and the second upper cover 110a2 may slip without physical impact during the winding process. Therefore, in the display device 1200 according to a further embodiment of the present disclosure, it is possible to suppress a defect such as separation or cracks that may occur between the first upper cover 110a1 and the second upper cover 110a2.

Figure 13:
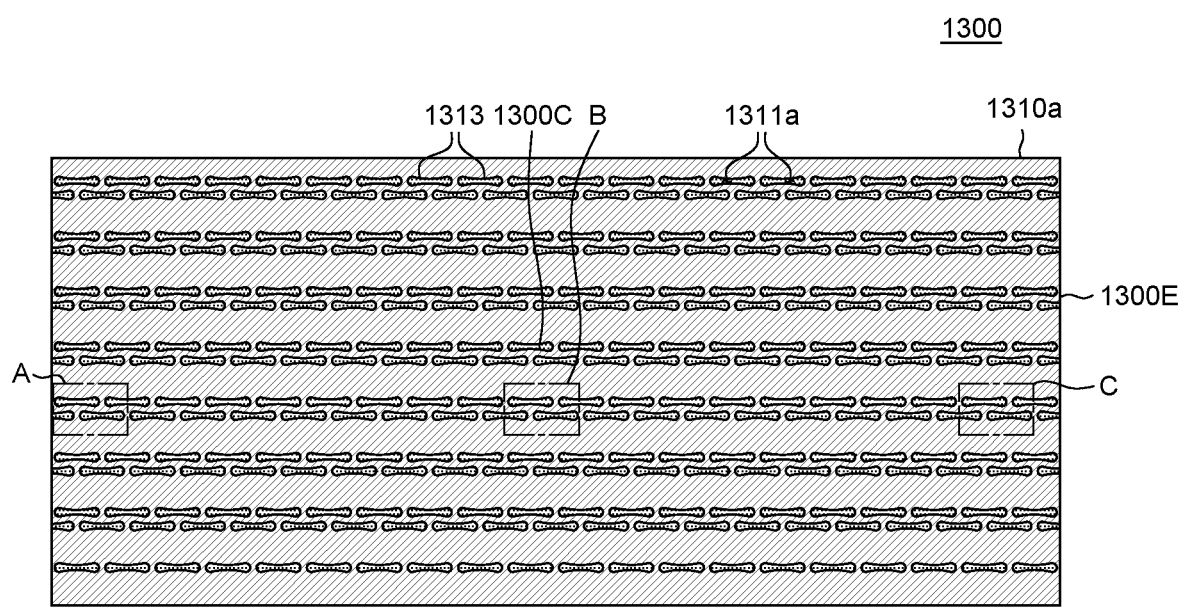
FIG. 13 is a schematic elevational view of a plate of a display device according to an embodiment of the present disclosure.
Figure 14A:
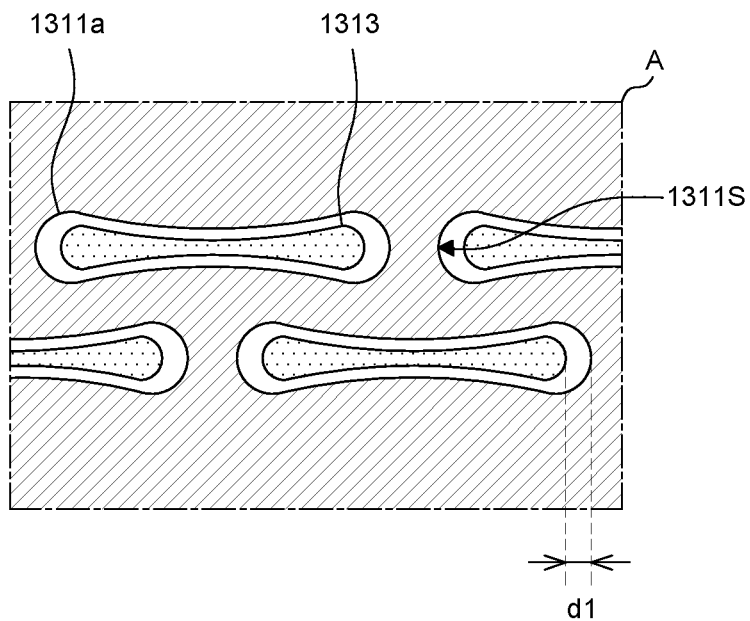
FIGS. 14A to 14C are enlarged views of areas A, B, and C, respectively, of the plate of FIG. 13.
Figure 14B:
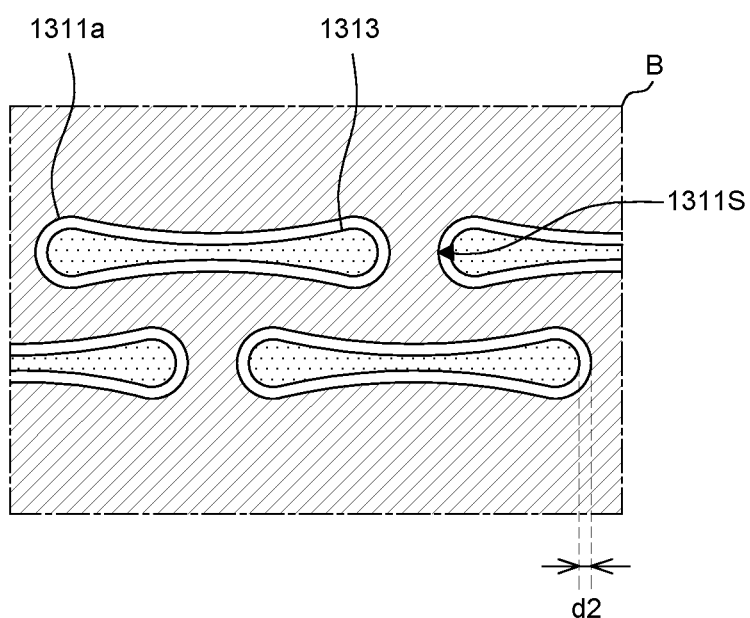
Figure 14C:
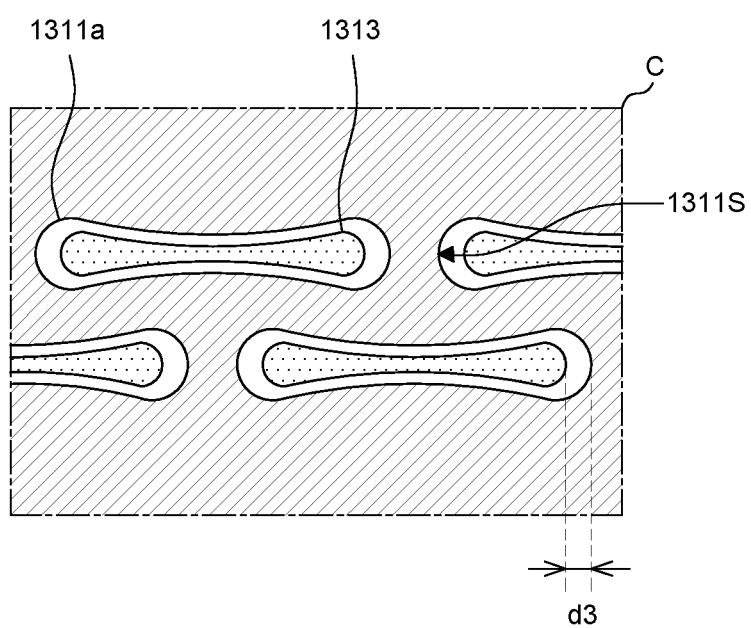

FIG. 13 is a schematic elevational view of a plate 1310a of a display device 1300 according to one or more embodiments of the present disclosure. FIGS. 14A-14C are enlarged views of FIG. 13. FIG. 14A is an enlarged view of area A in FIG. 13. FIG. 14B is an enlarged view of area B in FIG. 13. FIG. 14C is an enlarged view of area C in FIG. 13. Although not specifically illustrated, the plate 1310a may include a first plate 1310a1 and a second plate 1310a2 similar to the first and second upper covers 110a1, 110a2 and other first and second covers described herein, except as otherwise noted below.

With reference to FIG. 13, a first plate includes the plurality of support areas disposed between the plurality of first flexible areas and the plurality of first flexible areas.

The first flexible area of the first plate includes a plurality of first opening portions 1311a.

The plurality of support areas of the first plate is disposed between the plurality of first flexible areas. The plurality of first opening portions 1311a, which is disposed in the plurality of first flexible areas, is not disposed in the plurality of support areas.

A plurality of protruding patterns 1313 is disposed in the support area of a second plate. The plurality of protruding patterns 1313 is disposed to correspond to the plurality of first flexible areas of the first plate.

The plurality of protruding patterns 1313 may be disposed to protrude by a thickness of the first plate.

The plurality of protruding patterns 1313 may be inserted into the plurality of first opening portions 1311a of the first plate. That is, in an area that overlaps the plurality of support areas of the second plate, the protruding pattern 1313 of the second plate may be exposed through the first opening portion 1311a of the first plate.

When the plate 1310a is in a curved state, the plate 1310a may be curved with a radius of curvature that varies depending on positions or locations of the plate 1310a. For example, the radius of curvature of the plate 1310a may decrease in a direction from a central portion to an edge of the plate 1310a. However, the present disclosure is not limited thereto.

In this case, shapes, positions, intervals, sizes, and the like of the plurality of protruding patterns 1313 may be variously defined in accordance with a radius of curvature set when the curved display device 1300 is in a curved state. For example, in case that a central portion 1300C of the display device 1300 is curved with a relatively large radius of curvature and an edge 1300E of the display device 1300 is curved with a relatively small radius of curvature, a width of each of the plurality of protruding patterns 1313 may decrease in the direction from the central portion 1300C to the edge 1300E of the plate 1310a. Therefore, a spacing distance between the protruding pattern 1313 and a side surface of the first opening portion 1311a may increase in the direction from the central portion 1300C to the edge 1300E of the plate 1310a.

With reference to FIGS. 14A and 14B, a spacing distance d1 between the protruding pattern 1313 and the side surface 1311S of the first opening portion 1311a at the edge 1300E of the plate 1310a is larger than the spacing distance d2 between the protruding pattern 1313 and the side surface 1311S of the first opening portion 1311a at the central portion 1300C of the plate 1310a. In addition, with reference to FIGS. 14B and 14C, a spacing distance d3 between the protruding pattern 1313 and the side surface 1311S of the first opening portion 1311a at the edge 1300E of the plate 1310a is larger than the spacing distance d2 between the protruding pattern 1313 and the side surface 1311S of the first opening portion 1311a at the central portion 1300C of the plate 1310a.

Meanwhile, although not illustrated in FIGS. 13 to 14C, the second plate may include a plurality of second opening portions, as described herein. The plurality of second opening portions may be identical in shape to the first opening portion 1311a of the first plate. However, the present disclosure is not limited thereto.

The plurality of second opening portions of the second plate may be disposed to correspond to the plurality of support areas of the first plate. Therefore, the second opening portion of the second plate disposed on the rear surfaces of the plurality of support areas of the first plate may not be visually recognized from the front surface of the plate.

In the plate 1310a of the display device 1300 according to one or more embodiments of the present disclosure, the plate 1310a includes the first and second plates and having a small thickness, and the first plate and the second plate engage with each other. Therefore, the plate 1310a may have high rigidity with respect to the thickness in comparison with the case in which the plate 1310a includes a single cover.

In addition, in the plate 1310a of the display device 1300 according to one or more embodiments of the present disclosure, the first opening portion 1311a of the first plate and the second opening portion of the second plate may be formed by independent processes, thereby minimizing the area of the first opening portion 1311a and the area of the second opening portion. Therefore, it is possible to maintain rigidity of the display device 1300 and solve the problem in which the first opening portion 1311a and the second opening portion are visually recognized by the user in the display panel disposed on the front surface of the plate 1310a.

In addition, in the plate 1310a of the display device 1300 according to one or more embodiments of the present disclosure, the protruding pattern 1313 is disposed on the second plate. Therefore, the protruding pattern 1313 of the second plate is inserted into the first opening portion 1311a of the first plate, such that a coupling force between the first plate and the second plate is reinforced, thereby improving overall rigidity of the plate 1310a.

In addition, in the plate 1310a of the display device 1300 according to one or more embodiments of the present disclosure, in the curved state, the spacing distance between the protruding pattern 1313 and the side surface 1311S of the first opening portion 1311a varies depending on radii of curvature. For example, the plate 1310a is curved in a direction of a center 1300C thereof. As a radius of curvature of the curved plate 1310a decreases toward the edge 1300E of the plate 1310a, the first opening portion 1311a may contract more greatly or by a larger amount at the edge 1300E of the plate 1310a relative to the center 1300C of the plate 1310a. Therefore, in an area in which a radius of curvature decreases, the spacing distance between the protruding pattern 1313 and the side surface 1311S of the first opening portion 1311a may increase, thereby accommodating a change of the first opening portion 1311a and implementing stable curved operations with different radii of curvature.

Hereinafter, non-limiting examples of the benefits and advantages of display devices 100 and 1100 according to one or more embodiments of the present disclosure will be described with reference to Table 1.

TABLE 1

|  | Displacement Amount (mm) |
| --- | --- |
| Comparative embodiment | 1.2225 |
| Embodiment 1 | 0.7233 |
| Embodiment 2 | 0.55095 |

In Table 1, Comparative embodiment is an example in which a display device includes an upper cover for supporting a display panel of a display device that is a single cover, Embodiment 1 is a non-limiting example in which the display device includes the upper cover 110a of the display device 100 illustrated in FIGS. 1 to 7, and Embodiment 2 is a non-limiting example in which the display device includes the upper cover 1110a of the display device 1100 illustrated in FIGS. 11A to 11D. The upper cover of the Comparative Embodiment as well as the upper covers 110a and 1110a of Examples 1 and 2 have the same overall thickness of 0.4 mm. That is, in the Comparative Embodiment, the upper cover is provided as a single layer cover having a thickness of 0.4 mm. In Embodiment 1, a thickness of the first upper cover 110a1 is 0.2 mm, and a thickness of the second upper cover 110a2 is 0.2 mm. Even in Embodiment 2, a thickness of the first upper cover 1110a1 is 0.2 mm, and a thickness of the second upper cover 1110a2 is 0.2 mm. The displacement amount in Table 1 indicates a degree or amount of displacement that occurs when a first side or end of the covers is fixed and the other, second side or end of each of the covers is moved downward under a force of 20 N applied at the other, second side of each of the covers.

With reference to Table 1, the comparison of displacement amount indicates that a bending level in Embodiment 1 was improved by 59% in comparison with the Comparative Embodiment. In addition, it can be seen that the comparison of deformation amount according to a load indicates that a bending level of Embodiment 2 was improved by 76% in comparison with Embodiment 1. Thus, the techniques described herein significantly improve bending of a flexible or rollable display while reducing slip, as shown at least by the results in Table 1.

The embodiments of the present disclosure can also be described as follows:

According to one or more embodiments of the present disclosure, a display device comprises a display panel, a cover configured to support a rear surface of the display panel, and a roller configured to wind or unwind the display panel and the cover, the cover comprises an upper cover bonded to the display panel, the upper cover comprises a first upper cover, and a second upper cover including a plurality of concave portions and a plurality of convex portions, the first upper cover is disposed between the display panel and the second upper cover, and the first upper cover is disposed to engage with the plurality of concave portions and the plurality of convex portions of the second upper cover.

The first upper cover comprises a plurality of first opening portions, and the second upper cover may comprise a plurality of second opening portions that overlaps some of the plurality of first opening portions.

The first upper cover comprises a flexible area configured to overlap the display panel and provided in which the plurality of first opening portions is disposed, and the second upper cover may comprise a plurality of flexible areas in which the plurality of second opening portions is disposed, and a plurality of support areas disposed between the plurality of flexible areas.

The second upper cover further comprises a plurality of protruding patterns disposed in the plurality of support areas, and the plurality of protruding patterns may be inserted into the plurality of first opening portions of the first upper cover.

A size of each of the plurality of protruding patterns may be smaller than a size of each of the plurality of first opening portions.

The first upper cover comprises a plurality of flexible areas in which a plurality of first opening portions is disposed; and a plurality of support areas disposed between the plurality of flexible areas, and the second upper cover may comprise a plurality of flexible areas corresponding to the plurality of support areas of the first upper cover and provided in which a plurality of second opening portions is disposed, and a plurality of support areas correspond to the plurality of flexible areas of the first upper cover.

The second upper cover further comprises a plurality of protruding patterns disposed in the plurality of support areas of the second upper cover, and the plurality of protruding patterns may be inserted into the plurality of first opening portions of the first upper cover.

A size of each of the plurality of protruding patterns may be equal to a size of each of the plurality of first opening portions.

The first upper cover comprises a plurality of concave portions and a plurality of convex portions disposed to engage with the plurality of concave portions and the plurality of convex portions of the second upper cover, a width of each of the plurality of concave portions of the first upper cover is larger than a width of each of the plurality of convex portions of the second upper cover, and a width of each of the plurality of concave portions of the second upper cover may be larger than a width of each of the plurality of convex portions of the first upper cover.

A difference between the width of each of the plurality of concave portions of the first upper cover and the width of each of the plurality of convex portions of the second upper cover, which correspond to each other, and a difference between the width of each of the plurality of concave portions of the second upper cover and the width of each of the plurality of convex portions of the first upper cover, which correspond to each other, may increase in a direction from a lower side of the upper cover adjacent to the roller to an upper side of the upper cover.

In case that the display panel is wound so that a display surface of the display panel does not face the roller, the plurality of convex portions of the second upper cover may be disposed to be closer to the convex portion of the first upper cover at a lower side of the plurality of concave portions of the first upper cover than the convex portion of the first upper cover at an upper side of the plurality of concave portions of the first upper cover.

In case that the display panel is wound so that a display surface of the display panel faces the roller, the plurality of convex portions of the second upper cover may be disposed to be closer to the convex portion of the first upper cover at an upper side of the plurality of concave portions of the first upper cover than the convex portion of the first upper cover at a lower side of the plurality of concave portions of the first upper cover.

A spacing distance between the plurality of convex portions of the second upper cover and the convex portion of the first upper cover at a lower side of the plurality of concave portions of the first upper cover may be equal to a spacing distance between the plurality of convex portions of the second upper cover and the convex portion of the first upper cover at an upper side of the plurality of concave portions of the first upper cover.

The display device may further comprise a head bar disposed at an upper end of the upper cover and an upper end of the display panel; and a plurality of fastening members configured to fix the head bar, the upper cover, and the display panel, one of the first upper cover and the second upper cover includes fastening holes corresponding to the plurality of fastening members, and the other of the first upper cover and the second upper cover includes fastening holes corresponding to some of the plurality of fastening members.

An upper end of the second upper cover and a side surface of the second upper cover may be disposed to be spaced apart from the head bar.

The fastening hole of the other of the first upper cover and the second upper cover may have a width in an upward/downward direction larger than a width in a leftward/rightward direction.

When the display panel is in a fully unwound state, the plurality of fastening members may be disposed above or below the fastening holes of the other of the first upper cover and the second upper cover.

The display device may further comprise a friction reduction layer configured to reduce a frictional force in a horizontal direction and disposed on at least one of a surface of the first upper cover and a surface of the second upper cover that face each other.

The display device may further comprise a magnet disposed on at least one of a surface of the first upper cover and a surface of the second upper cover that face each other.

The cover may further comprise a lower cover configured to connect the upper cover and the roller.

According to an one or more embodiments of the present disclosure, a plate for a display device, the plate comprising a first plate comprising a plurality of first opening portions; and a second plate disposed on a rear surface of the first plate and including a plurality of protruding patterns, the plurality of protruding patterns of the second plate is inserted into the plurality of first opening portions of the first plate, and a spacing distance between each of the plurality of protruding patterns and a side surface of each of the plurality of first opening portions increases in a direction from a central portion to an edge of the plate.

A radius of curvature of the plate may decrease in the direction from the central portion to the edge of the plate.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a display panel;
a cover disposed on the display panel; and
a roller configured to wind or unwind the display panel and the cover,
wherein the cover includes an upper cover coupled to the display panel,
wherein the upper cover includes a first upper cover and a second upper cover, the second upper cover including a plurality of concave portions and a plurality of convex portions, wherein an interval between the plurality of convex portions of the second upper cover increases from a lower side of the second upper cover to an upper side of the second upper cover,
wherein the first upper cover is disposed between the display panel and the second upper cover,
wherein the first upper cover engages with the plurality of concave portions and the plurality of convex portions of the second upper cover, and
wherein the increasing interval between the plurality of convex portions of the second upper cover varies a spacing between the first upper cover and the second upper cover to account for slippage while winding and unwinding the display panel and the cover about the roller,
wherein the first upper cover includes a plurality of first opening portions disposed in a plurality of convex portions and a plurality of concave portions of the first upper cover, and the second upper cover includes a plurality of second opening portions disposed in the plurality of concave portions and the plurality of convex portions of the second upper cover.

2. The display device of claim 1, wherein the first upper cover includes a flexible area that overlaps the display panel, and includes the plurality of first opening portions, and
wherein the second upper cover includes a plurality of flexible areas including the plurality of second opening portions, the second upper cover further including a plurality of support areas disposed between the plurality of flexible areas.

3. The display device of claim 2, wherein the second upper cover further includes a plurality of protruding patterns disposed in the plurality of support areas, and
wherein the plurality of protruding patterns are received in the plurality of first opening portions of the first upper cover.

4. The display device of claim 3, wherein a size of each of the plurality of protruding patterns of the second upper cover is smaller than a size of each of the plurality of first opening portions of the first upper cover.

5. The display device of claim 1, wherein the first upper cover further includes a plurality of flexible areas including the plurality of first opening portions and a plurality of support areas disposed between the plurality of flexible areas, and
wherein the second upper cover further includes a plurality of flexible areas corresponding to the plurality of support areas of the first upper cover, the plurality of flexible areas of the second upper cover including the plurality of second opening portions, the second upper cover further including a plurality of support areas corresponding to the plurality of flexible areas of the first upper cover.

6. The display device of claim 5, wherein the second upper cover further includes a plurality of protruding patterns disposed in the plurality of support areas of the second upper cover, and
wherein the plurality of protruding patterns are received in the plurality of first opening portions of the first upper cover.

7. The display device of claim 6, wherein a size of each of the plurality of protruding patterns is equal to a size of each of the plurality of first opening portions.

8. The display device of claim 1, wherein the first upper cover includes a plurality of concave portions and a plurality of convex portions that interface with the plurality of concave portions and the plurality of convex portions of the second upper cover,
wherein a width of each of the plurality of concave portions of the first upper cover is larger than a width of each of the plurality of convex portions of the second upper cover, and
wherein a width of each of the plurality of concave portions of the second upper cover is larger than a width of each of the plurality of convex portions of the first upper cover.

9. The display device of claim 8, wherein a difference between the width of each of the plurality of concave portions of the first upper cover and the width of each of the corresponding plurality of convex portions of the second upper cover and a difference between the width of each of the plurality of concave portions of the second upper cover and the width of each of the respective plurality of convex portions of the first upper cover both increase in a direction from the lower side of the upper cover adjacent to the roller to the upper side of the upper cover.

10. The display device of claim 9, wherein the roller is configured to wind or unwind the display panel with a display surface of the display panel facing away from the roller, and the plurality of convex portions of the second upper cover is disposed to be closer to a first convex portion of the first upper cover at a lower side of the plurality of concave portions of the first upper cover than a second convex portion of the first upper cover at an upper side of the plurality of concave portions of the first upper cover.

11. The display device of claim 9, wherein the roller is configured to wind or unwind the display panel with a display surface of the display panel facing the roller, and the plurality of convex portions of the second upper cover is disposed to be closer to a first convex portion of the first upper cover at an upper side of the plurality of concave portions of the first upper cover than a second convex portion of the first upper cover at a lower side of the plurality of concave portions of the first upper cover.

12. The display device of claim 9, wherein a spacing distance between the plurality of convex portions of the second upper cover and the plurality of convex portions of the first upper cover at a lower side of the plurality of concave portions of the first upper cover is equal to a spacing distance between the plurality of convex portions of the second upper cover and the plurality of convex portions of the first upper cover at an upper side of the plurality of concave portions of the first upper cover.

13. The display device of claim 1, further comprising:
a head bar disposed at an upper end of the upper cover and an upper end of the display panel; and
a plurality of fasteners configured to fix the head bar, the upper cover, and the display panel to each other,
wherein a first one of the first upper cover and the second upper cover includes fastening holes corresponding to the plurality of fasteners, and
wherein a second one of the first upper cover and the second upper cover includes fastening holes corresponding to some of the plurality of fasteners.

14. The display device of claim 13, wherein an upper end of the second upper cover and a side surface of the second upper cover are spaced apart from the head bar.

15. The display device of claim 13, wherein the fastening holes of the second one of the first upper cover and the second upper cover have a width in an upward and downward direction that is greater than a width in a leftward and rightward direction.

16. The display device of claim 15, wherein in response to the display panel being in a fully unwound state, the plurality of fasteners is disposed above or below the fastening holes of the second one of the first upper cover and the second upper cover.

17. The display device of claim 1, further comprising: a friction reduction layer disposed on at least one of a surface of the first upper cover that faces the second upper cover and a surface of the second upper cover that faces the first upper cover, the friction reduction layer configured to reduce a frictional force between the first upper cover and the second upper cover.

18. The display device of claim 1, further comprising:
a magnet disposed on at least one of a surface of the first upper cover and a surface of the second upper cover that face each other.

19. The display device of claim 1, wherein the cover further includes a lower cover coupled to the upper cover and to the roller.

* * * * *